(12) United States Patent
Igarashi

(10) Patent No.: US 8,230,004 B2
(45) Date of Patent: Jul. 24, 2012

(54) INFORMATION PROCESSING APPARATUS, INFORMATION COMMUNICATION SYSTEM, INFORMATION PROCESSING METHOD, AND COMPUTER PROGRAM

(75) Inventor: Tatsuya Igarashi, Tokyo (JP)

(73) Assignee: Sony Corporation, Tokyo (JP)

(*) Notice: Subject to any disclaimer, the term of this patent is extended or adjusted under 35 U.S.C. 154(b) by 513 days.

(21) Appl. No.: 12/281,764

(22) PCT Filed: Feb. 23, 2007

(86) PCT No.: PCT/JP2007/053399
§ 371 (c)(1),
(2), (4) Date: Jan. 16, 2009

(87) PCT Pub. No.: WO2007/105460
PCT Pub. Date: Sep. 20, 2007

(65) Prior Publication Data
US 2009/0222514 A1    Sep. 3, 2009

(30) Foreign Application Priority Data

Mar. 7, 2006    (JP) .................................. P2006-61230
Jan. 12, 2007   (JP) ................................ P2007-004540

(51) Int. Cl.
*G06F 15/16*    (2006.01)
(52) U.S. Cl. ........................................ 709/203; 709/238
(58) Field of Classification Search .................. 709/203, 709/238
See application file for complete search history.

(56) References Cited

U.S. PATENT DOCUMENTS 6,226,788 B1 * 5/2001 Schoening et al. ........... 717/107
6,963,925 B1 * 11/2005 Ishikawa et al. .............. 709/238
2004/0045036 A1   3/2004 Terasaki

FOREIGN PATENT DOCUMENTS

| EP | 1 742 153 | 1/2007 |
| JP | 2000-174797 | 6/2000 |
| JP | 2001-007861 | 1/2001 |
| JP | 2001-251341 | 9/2001 |
| JP | 2003-134142 | 5/2003 |
| JP | 2003-308264 | 10/2003 |

(Continued)

OTHER PUBLICATIONS

Notification of Reasons for Refusal issued in corresponding Japanese Patent Application No. 2007-004540 on Jul. 19, 2011.

(Continued)

*Primary Examiner* — Adnan Mirza
(74) *Attorney, Agent, or Firm* — Finnegan, Henderson, Farabow, Garrett & Dunner, L.L.P.

(57) ABSTRACT

A configuration is provided in which a device in a home network receives content from a server outside the home network and plays the content. A home IMS gateway maps an external server outside the home network as a virtual home network device, and provides mapped server information in response to reception of a device discovery request from a content playing apparatus (DMP) in the home network. Furthermore, a content obtaining request is transferred from the content playing apparatus to the external server so that the external server sends content to the content playing apparatus. Authentication and key exchange defined in DLNA are executed between the content playing apparatus and the home IMS gateway, and a key generated is sent from the home IMS gateway to a content providing server. The external server sends encrypted content based on the received key.

31 Claims, 14 Drawing Sheets

FOREIGN PATENT DOCUMENTS

| | | |
|---|---|---|
| JP | 2004-088466 | 3/2004 |
| JP | 2005-102240 | 4/2005 |
| JP | 2005-107728 | 4/2005 |
| JP | 2005-244705 | 9/2005 |
| JP | 2005-295585 | 10/2005 |
| JP | 2005-301449 | 10/2005 |
| JP | 2003-311773 | 11/2005 |
| JP | 2006-053767 | 2/2006 |
| JP | 2006-507758 | 3/2006 |
| WO | WO 2004/095293 A1 | 4/2004 |
| WO | WO 2004/095293 | 11/2004 |
| WO | WO 2007/102547 A1 | 9/2007 |
| WO | WO 2007/102548 A1 | 9/2007 |

OTHER PUBLICATIONS

R. Johansson, "Converging Requirements on the Residential Gateway," Oct. 6, 2005, URL: http://www.iec.org/events/2005/bbwf/pdfs/g2_rolf_johansson_ericsson.pdf.

K Horiuchi, Trend of DLNA, Nikkei Byte, No. 260, Japan, Nikkei BP, Nikkei Business Publications, Inc., Dec. 20, 2004, p. 56-63.

Supplemental European Search Report dated Sep. 23, 2011, issued in corresponding European Application No. 07714870.8-2223/2000915.

Kang et al., "UPnP AV Architectural Multimedia System with a Home Gateway Powered by the OSGi Platform", Digest of Technical Papers, International Conference on Consumer Electronics, Jan. 8, 2005, pp. 405-406.

"Digital Living Network Alliance (DLNA), Overview and Vision", Jun. 2004, http://www.dlna.org/en/industry/about/DLNA_overview.pdf, retrieved Jan. 1, 2007.

Decision of Refusal dated Dec. 6, 2011 in Japanese Application No. 2007-004540, 5 pages including translation.

Decision of Refusal dated Dec. 6, 2011 in Japanese Application No. 2008-503891, 3 pages including translation.

Decision of Refusal dated Dec. 6, 2011 in Japanese Application No. 2008-503893, 3 pages including translation.

Decision of Refusal dated Dec. 6, 2011 in Japanese Application No. 2008-503894, 3 pages including translation.

Decision of Refusal dated Dec. 6, 2011 in Japanese Application No. 2008-503892, 3 pages including translation.

Decision of Refusal dated Dec. 6, 2011 in Japanese Application No. 2008-505082, 3 pages including translation.

IEICE Technical Report, ISSN 0913-5685, vol. 105, No. 409, Nov. 17, 2005, Mobile Multimedia Communications, MoMuC 2005-59, 11 pages.

European Search Report issued in corresponding European Patent Application No. 07737973.3, dated Sep. 22, 2011.

European Office Action issued in corresponding European Patent Application No. 07737973.3, dated Oct. 11, 2011.

* cited by examiner

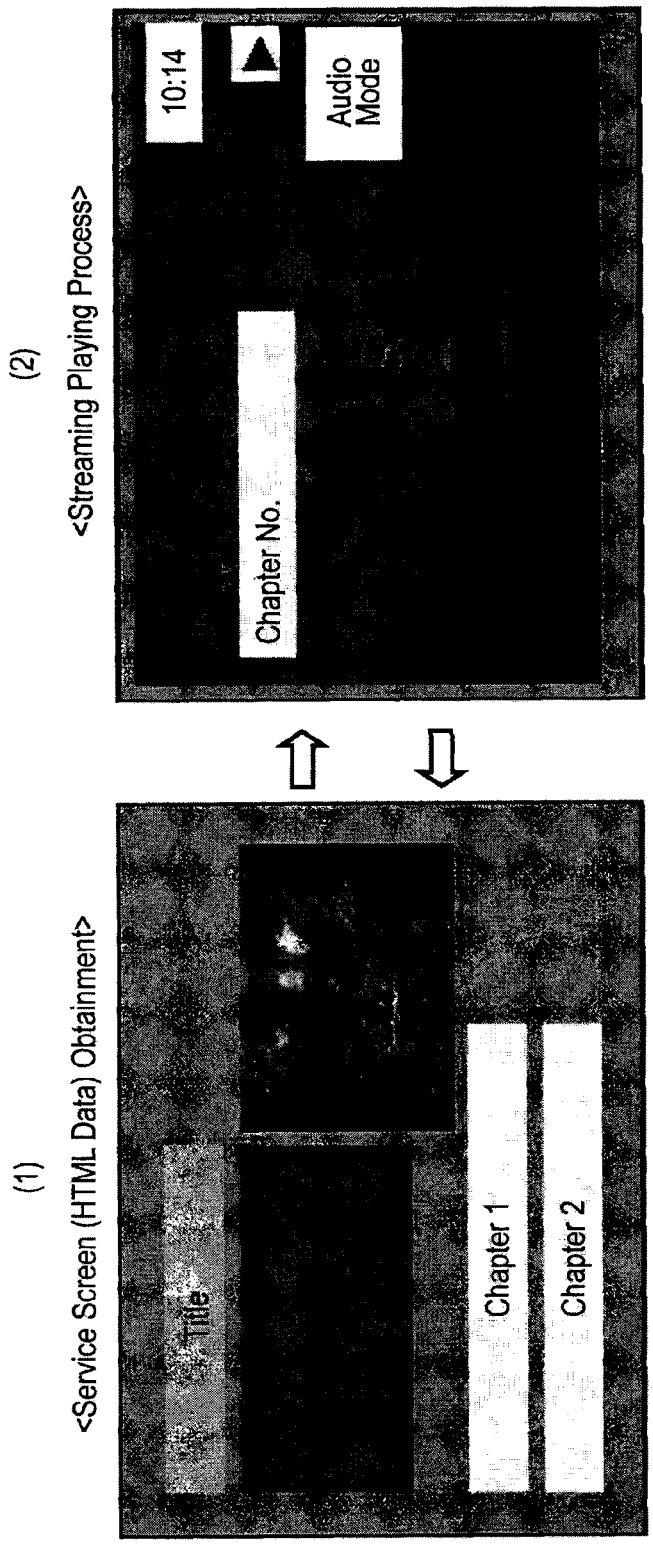

INFORMATION PROCESSING APPARATUS, INFORMATION COMMUNICATION SYSTEM, INFORMATION PROCESSING METHOD, AND COMPUTER PROGRAM

TECHNICAL FIELD

The present invention relates to information processing apparatuses, information communication systems, information processing methods, and computer programs. Particularly, the present invention relates to an information processing apparatus, an information communication system, an information processing method, and a computer program for implementing use of data supplied from outside a home network at a device in the home network.

BACKGROUND ART

With the spread of PCs and digital home appliances, it is becoming a reality to interconnect these devices via a home IP (Internet Protocol) network and to share and enjoy digital content, such as video, audio, and pictures. For example, DLNA (Digital Living Network Alliance) defines technical specification and implementing guideline needed for sharing digital content among these digital devices so that it is possible to interconnect devices of different vendors with each other, and DLNA has become an industry standard of home IP networks.

FIG. 1 shows an example of a home network 100 proposed by DLNA. A DVR (Digital Video Recorder) 101 and a PC 102 with a built-in TV tuner, as digital video content recording apparatuses, are capable of receiving satellite and terrestrial analog broadcasting and digital broadcasting, and record and save broadcast programs on built-in hard disk recorders. In DLNA, a device that stores content and that provides the content to devices in a home network is called a digital media server (DMS). In FIG. 1, the DVR 101 and the PC 102 are DMSs.

A DMS is capable of performing streaming transmission of, for example, video content of a TV program recorded on a hard disk to a digital media player (DMP) connected via a home IP network. The digital media player (DMP) is a device that receives content from a DMS and plays the content.

In the example shown in FIG. 1, a DMP is implemented on a TV 103, and, for example, by using an infrared remote controller or the like of the TV 103, a user can operate the TV 103 to play video content stored on the PC 102 or the DVR 101 placed in a remote room. Note that a residential gateway (RG) 104, which is used as a network connecting device in a case where a device in a home is connected to an IP broadband network 120 as the Internet, is used as a bridge for IP connection of a device in a home in the example of use of DLNA.

Meanwhile, a revolution is seen in broadcasting systems, and IPTV services, VOD (Video On Demand) services, and so forth that transmit video content via IP broadband networks, which has hitherto been broadcast using terrestrial waves or satellites, are coming to be commercialized. FIG. 2 shows a schematic diagram of IPTV and VOD services.

In a home, an STB (Set Top Box) 151 is installed so that it is possible to receive via the RG (Residential Gateway) 104 and via the IP broadband network 120 content based on services from various IPTV service providing servers 121 a1 to an and VOD service providing servers 122 b1 to bn. The STB (Set Top Box) 151 has a function of receiving video information, application executing functions needed for command transmission and reception, for MPEG decoding, and also for playing of received data, and so forth.

The residential gateway (RG) 104, in some cases, receives services (content) provided by a plurality of IPTV service providing servers 121 or VOD service providing servers 122 via the same agent, for example, an access line providing company such as a telephone company or a CableTV company, and in other cases, receives individual services separately. However, it is necessary that the STB (Set Top Box) 151 itself, used by the user, is configured as a system supporting an IPTV service of a connection destination.

As such IPTV services and VOD services become common in the future, similarly to the conventional sharing and viewing by DLNA devices of TV broadcast content as ordinary broadcast broadcasting, user's need arises for using video content provided from IPTV services on DLNA devices.

As proposed solutions for meeting such demand, a method in which a device having a large-capacity hard disk, such as a home server, downloads video content from an IPTV service and shares the video content in a home network, or a method in which a protocol, media format, and so forth of an IPTV service are converted at a residential gateway (RG) into a protocol and media format of a DLNA device and the IPTV service is provided to a home network connecting device, is conceivable. Note that a home-network embedded module that executes a format converting process is described in Patent Document 1.

However, in the former case, a time for downloading is needed for temporary storage at a home server, so that it is difficult to enjoy video when desired, which is possible with a video on demand service, and it is not suitable for live viewing. In the latter configuration in which processing is executed by a residential gateway (RG), it is necessary that the residential gateway (RG) executes protocol conversion and media format conversion, so that high-performance hardware is needed and software becomes complex, and the RG becomes expensive.

Generally, in many cases, an RG is supplied from an access line providing company (telephone company or the like) of a broadband network, and this becomes an obstacle in a case where IPTV services are provided on the open Internet, for example, IPTV services available for the user are limited to the vendor provided by the access line. Although it is possible to provide a new gateway device in a home IP network separately from the residential gateway (RG), in this case, depending on the network topology, content streaming data is transmitted in duplicates in the home network, so that such a situation occurs that a band in the home network is used in vain.

Note that an example of connection between a DLNA device in a home network and a content distribution service on the Internet is the Viiv (registered trademark) technology of the U.S. Intel Corporation. Viiv is considered as a platform of PC hardware and software, and is intended for stream viewing of content on a PC from the Internet by a Dual Core high-performance CPU. At the same time, Viiv has a DLNA function, and serves as a DLNA media server that performs streaming of content temporarily downloaded from the Internet to the PC to another DLNA device connected to the home network.

Patent Document 1: Japanese Unexamined Patent Application Publication (Translation of PCT Application) No. 2005-531231

DISCLOSURE OF INVENTION

Technical Problem

As described above, in a case where content provided by IPTV services or VOD services is also to be used by a DLNA device similarly to TV broadcasting content as ordinary broadcast broadcasting, in existing home network configurations, it is necessary to download content in advance at a digital media server (DMS), such as a PC, a DVR, or the like in a home network, or to provide a residential gateway (RG) with protocol and media format conversion functions. The former case lacks real-time characteristics, so that it is unsuitable for a streaming playing process or the like, and the latter case leads to the problem of increased cost.

The present invention has been made in view of the problems described above, and it is an object thereof to provide an information processing apparatus, an information communication system, an information processing method, and a computer program with which it is possible to view content provided by an external server outside a home network, such as an IPTV service, by using an existing DLNA device in, for example, an open Internet connection environment that does not depend on infrastructure such as an access line and gateway to the Internet.

Technical Solution

A first aspect of the present invention is an information processing apparatus characterized by comprising:
a communication interface used for data communication;
a data processing unit that executes a process of executing communication with an external server existing outside a home network to map the external server as a virtual home network device; and
a storage unit that stores the mapping information, and characterized in that the data processing unit is configured to:
execute a process of, in response to reception of a device discovery request from a client device in the home network, obtaining the mapping information stored in the storage unit, and on the basis of the mapping information, providing the client device with server information corresponding to the external server as information of a device from which a service can be received.

Furthermore, an embodiment of the information processing apparatus according to the present invention is characterized in that the data processing unit is configured to, on the basis of communication with the external server existing outside the home network, execute a process of generating an instance in which the external server information is recorded and storing the instance in the storage unit, and in response to reception of the device discovery request from the client device in the home network, provide the client device with the external server information obtained from the instance stored in the storage unit.

Furthermore, an embodiment of the information processing apparatus according to the present invention is characterized in that the data processing unit is configured to, in response to reception of the device discovery request from the client device, execute a process of providing the client device with the external server information as information of a device from which a service can be received and transferring subsequent requests and responses from the client device to the external server, or execute a process of providing the client device with information of the external server so that direct communication is performed between the client device and the external server.

Furthermore, an embodiment of the information processing apparatus according to the present invention is characterized in that the external server is a service providing server outside the home network in which an IP multimedia subsystem (IMS) is used, and the data processing unit is configured to execute a process of mapping the service providing server as a home network device.

Furthermore, an embodiment of the information processing apparatus according to the present invention is characterized in that the data processing unit is configured to execute a process of mapping the external server as a digital media server (DMS) defined as a content providing server in DLNA (Digital Living Network Alliance).

Furthermore, an embodiment of the information processing apparatus according to the present invention is characterized in that the data processing unit is configured to execute a process of executing communication with external servers existing outside the home network, obtaining a service list provided by the external servers, obtaining service selection information of a user based on the service list, and mapping only an external server that provides a selected service as a virtual home network device.

Furthermore, an embodiment of the information processing apparatus according to the present invention is characterized in that the data processing unit is configured to execute a process of outputting the service list to a display unit of the information processing apparatus or to a home network connecting device, sending user selection information regarding the service list to a management server outside the home network, and mapping, as a virtual home network device, an external server that provides a service for which selection information has been registered at the management server.

Furthermore, an embodiment of the information processing apparatus according to the present invention is characterized in that the data processing unit is configured to execute a process of receiving from the client device a content list request to the mapped external server, transferring the request to the external server, and obtaining the content list from the external server and providing the client device with the content list.

Furthermore, an embodiment of the information processing apparatus according to the present invention is characterized in that the content list is a list in which a content URL corresponding to content, provided to the external server, is set, and having a setting such that the client device is allowed to obtain the content based on the content URL without involving the information processing apparatus.

Furthermore, an embodiment of the information processing apparatus according to the present invention is characterized in that the data processing unit is configured to execute a process of providing the client device with setting information that sets the information processing apparatus as a counterparty of an authentication and key exchange process that the client device is requested to execute as a condition for obtaining content from the external server at the client device.

Furthermore, an embodiment of the information processing apparatus according to the present invention is characterized in that the data processing unit is configured to execute a process of providing the client device with a content list in which the setting information that sets the information processing apparatus as the counterparty of the authentication and key exchange process is included in meta information.

Furthermore, an embodiment of the information processing apparatus according to the present invention is characterized in that the data processing unit is configured to execute a process of sending a key generated in an authentication and key exchange process executed with the client device to the external server as a content obtaining source.

Furthermore, an embodiment of the information processing apparatus according to the present invention is characterized in that the data processing unit is configured to execute a process of receiving from the client device a service screen obtaining request to the mapped external server, transferring the request to the external server, and obtaining a service screen from the external server and providing the client device with the service screen.

Furthermore, an embodiment of the information processing apparatus according to the present invention is characterized in that the data processing unit is configured to execute a process of receiving from the client device a service screen obtaining request according to HTTP (Hyper Text Transfer Protocol), transferring the request to the external server, and receiving from the external server an HTTP response including a service screen formed of HTML (HyperText Markup Language) data and transferring the HTTP response to the client device.

Furthermore, a second aspect of the present invention is an information communication system comprising a client apparatus in a home network, a content providing server outside the home network, and a gateway apparatus in the home network, characterized in that:

the gateway apparatus is configured to execute:

a process of executing communication with the content providing server to map the content providing server as a virtual home network device;

a process of, in response to reception of a device discovery request from the client apparatus, obtaining the mapping information, and on the basis of the mapping information, providing the client device with server information corresponding to the content providing server as information of a device from which a service can be received; and a process of receiving from the client apparatus a request for obtaining content provided by the content providing server and transferring the request to the content providing server, and the client apparatus is configured to execute:

a process of receiving the content provided by the content providing server and playing the content.

Furthermore, an embodiment of the information communication system according to the present invention is characterized in that the gateway apparatus is configured to execute a process of receiving from the client apparatus a content list request to the mapped content providing server, transferring the request to the content providing server, and obtaining a content list from the content providing server and providing the client apparatus with the content list.

Furthermore, an embodiment of the information communication system according to the present invention is characterized in that the gateway apparatus is configured to execute a process of providing the client apparatus with setting information that sets the gateway apparatus as a counterparty of an authentication and key exchange process executed at the client apparatus as a condition for obtaining content from the content providing server, and sending an encryption key generated in the authentication and key exchange process executed with the client apparatus to the content providing server.

Furthermore, an embodiment of the information communication system according to the present invention is characterized in that the content providing server encrypts content to send by using the encryption key received from the gateway apparatus and sends encrypted content generated to the client apparatus, and the client apparatus is configured to execute a process of decrypting the received encrypted content by using the encryption key.

Furthermore, an embodiment of the information communication system according to the present invention is characterized in that the gateway apparatus is configured to execute a process of receiving from the client apparatus a service screen obtaining request based on HTTP (Hyper Text Transfer Protocol), transferring the request to the content providing server, and receiving from the content providing server an HTTP response including a service screen formed of HTML (HyperText Markup Language) data and transferring the HTTP response to the client apparatus.

Furthermore, an embodiment of the information communication system according to the present invention is characterized in that the client apparatus is configured to execute a process of displaying a service screen on a display, the service screen being generated by executing a drawing process by using an HTML browser on HTML data received from the content providing server via the gateway apparatus.

Furthermore, an embodiment of the information communication system according to the present invention is characterized in that the client apparatus is configured to input content selection information from a user regarding a content list included in the service screen, identify a resource URL corresponding to selected content on the basis of the content selection information, and execute a content streaming process based on the resource URL.

Furthermore, a third aspect of the present invention is an information processing method for an information processing apparatus, in which a process of making setting on a client device connected to a home network so that it is allowed to use content provided by an external server outside the home network is executed, characterized by comprising:

a mapping process step, executed at a data processing unit of the information processing apparatus, of executing communication with the external server via a communication unit to execute a mapping process of setting the external server as a virtual home network device, and storing mapping information based on the mapping process in a storage unit; and an external server information providing step, executed at the data processing unit in response to reception of a device discovery request from the client device, of executing a process of obtaining the mapping information stored in the storage unit, and on the basis of the mapping information, providing the client device with server information corresponding to the external server as information of a device from which a service can be received.

Furthermore, an embodiment of the information processing method according to the present invention is characterized in that the mapping process step is a step of executing a process of, on the basis of communication with the external server existing outside the home network, generating an instance in which the external server information is recorded and storing the instance in the storage unit, and the external server information providing step is a step of, in response to reception of the device discovery request from the client device in the home network, providing the client device with the external server information obtained from the instance stored in the storage unit.

Furthermore, an embodiment of the information processing method according to the present invention is characterized in that, in the information processing method, in response to reception of the device discovery request from the client device, the data processing unit further executes a process of providing the client device with the external server information as information of a device from which a service can be received and transferring subsequent requests and responses from the client device to the external server, or executes a process of providing the client device with information of the external server so that direct communication is performed between the client device and the external server.

Furthermore, an embodiment of the information processing method according to the present invention is characterized in that the external server is a service providing server outside the home network in which an IP multimedia subsystem (IMS) is used, and the mapping process step is a step of executing a process of mapping the service providing server as a home network device.

Furthermore, an embodiment of the information processing method according to the present invention is characterized in that the mapping process step is a step of executing a process of mapping the external server as a digital media server (DMS) defined as a content providing server in DLNA (Digital Living Network Alliance).

Furthermore, an embodiment of the information processing method according to the present invention is characterized in that the mapping process step is a step of executing a process of executing communication with external servers existing outside the home network, obtaining a service list provided by the external servers, obtaining service selection information of a user based on the service list, and mapping only an external server that provides a selected service as a virtual home network device.

Furthermore, an embodiment of the information processing method according to the present invention is characterized in that the mapping process step is a step of executing a process of outputting the service list to a display unit of the information processing apparatus or to a home network connecting device, sending user selection information regarding the service list to a management server outside the home network, and mapping, as a virtual home network device, an external server that provides a service for which selection information has been registered at the management server.

Furthermore, an embodiment of the information processing method according to the present invention is characterized in that the information processing method further comprises a step of executing, at the data processing unit, a process of receiving from the client device a content list request to the mapped external server, transferring the request to the external server, and obtaining the content list from the external server and providing the client device with the content list.

Furthermore, an embodiment of the information processing method according to the present invention is characterized in that the content list is a list in which a content URL corresponding to content, provided to the external server, is set, and having a setting such that the client device is allowed to obtain the content based on the content URL without involving the information processing apparatus.

Furthermore, an embodiment of the information processing method according to the present invention is characterized in that the information processing method further comprises a step of executing, at the data processing unit, a process of providing the client device with setting information that sets the information processing apparatus as a counterparty of an authentication and key exchange process that the client device is requested to execute as a condition for obtaining content from the external server at the client device.

Furthermore, an embodiment of the information processing method according to the present invention is characterized in that, in the information processing method, at the data processing unit, a process of providing the client device with a content list in which the setting information that sets the information processing apparatus as the counterparty of the authentication and key exchange process is included in meta information is executed.

Furthermore, an embodiment of the information processing method according to the present invention is characterized in that the information processing method further comprises a step of executing, at the data processing unit, a process of sending a key generated in an authentication and key exchange process executed with the client device to the external server as a content obtaining source.

Furthermore, an embodiment of the information processing method according to the present invention is characterized in that the information processing method further comprises a step of executing, at the data processing unit, a process of receiving from the client device a service screen obtaining request to the mapped external server, transferring the request to the external server, and obtaining a service screen from the external server and providing the client device with the service screen.

Furthermore, an embodiment of the information processing method according to the present invention is characterized in that the information processing method further comprises a step of executing, at the data processing unit, a process of receiving from the client device a service screen obtaining request according to HTTP (Hyper Text Transfer Protocol), transferring the request to the external server, and receiving from the external server an HTTP response including a service screen formed of HTML (HyperText Markup Language) data and transferring the HTTP response to the client device.

Furthermore, a fourth aspect of the present invention is a computer program for causing an information processing apparatus to execute a process of making setting on a client device connected to a home network so that it is allowed to use content provided by an external server outside the home network, characterized by causing execution of:

a mapping process step of causing a data processing unit of the information processing apparatus to execute communication with the external server via a communication unit, to execute a mapping process of setting the external server as a virtual home network device, and to store mapping information based on the mapping process in a storage unit; and an external server information providing step of causing the data processing unit to execute a process of, in response to reception of a device discovery request from the client device, obtaining the mapping information stored in the storage unit, and on the basis of the mapping information, providing the client device with server information corresponding to the external server as information of a device from which a service can be received.

Note that the computer program according to the present invention is a computer program that can be provided, for example, to a computer system capable of executing various program codes via a storage medium or communication medium that provides the program in a computer-readable format, for example, a recording medium such as a CD, FD, or MO, or a communication medium such as a network. By providing such a program in a computer-readable format, a process according to the program is implemented on the computer system.

Other objects, features, and advantages of the present invention will become apparent from more detailed description based on embodiments of the present invention described later and the accompanying drawings. Note that in this specification, a system is a logically combined configuration of a plurality of apparatuses, and is not limited to one in which the constituent apparatuses exist within the same case.

Advantageous Effects

According to the configuration of the present invention, it becomes possible for a DMP as a content playing apparatus, which is a client device in a home network, to receive content from a content providing server outside the home network and to play the content. That is, a home IMS gateway, which is an information processing apparatus according to the present invention, executes communication with a content providing server to map the content providing server as a virtual home network device, and in response to reception of a device discovery request from a content playing apparatus in a home network, the home IMS gateway provides the content playing device with server information of the content providing server as information of a device from which a service can be received. Furthermore, the home IMS gateway causes a content obtaining request to be transferred from the content playing apparatus to the content providing server so that the content providing server sends content to the content playing apparatus. Furthermore, a process for authentication and key exchange defined in DLNA is also executed between the content playing apparatus and the home IMS gateway as defined. By sending a key generated from the home IMS gateway to the content providing server, the content providing server and the content playing apparatus can share the key, so that secure transmission and reception of encrypted content is achieved between both parties.

BRIEF DESCRIPTION OF DRAWINGS

FIG. 14 is a diagram showing an example of a service screen provided by an AS (IPTV) and a screen display on occasion of a streaming playing process.

BEST MODE FOR CARRYING OUT THE INVENTION

Hereinafter, with reference to the drawings, an information processing apparatus, an information communication system, an information processing method, and a computer program according to the present invention will be described in detail.

First, with reference to FIG. 3, an example configuration of an information communication system according to the present invention will be described. IPTV service systems have been developed and commercialized by various vendors, such as U.S. Microsoft Corporation. In this embodiment, description will be given regarding an example where an IPTV service architecture that uses an IP multimedia subsystem (IMS) is used.

IMS has originally been developed by 3GPP (3rd Generation Partnership Project), which is a project for standardizing 3rd generation mobile communication systems, as base technologies for providing, for example, push to talk conference systems, which enable conversation by three or more cellular phones, communication such as instant messages, and multimedia additional services in voice telephony services on wireless communication infrastructure for cellular phones.

IMS is based on IP technologies, and is highly compatible with Internet infrastructure for fixed communication systems. In the midst of movement for integrating wired and wireless communication network infrastructure by IP, called FMC (Fixed Mobile Convergence), attention is being given to IPTV systems that use IMS.

IMS is composed of functional elements such as a home subscriber subsystem (HSS) and an application server (AS), with a functional component called CSCF (Call Session Control Function) as a core, which is based on SIP (Session Initiation Protocol) defined by RFC-3261 of IETF (The Internet Engineering Task Force).

Figure 3:
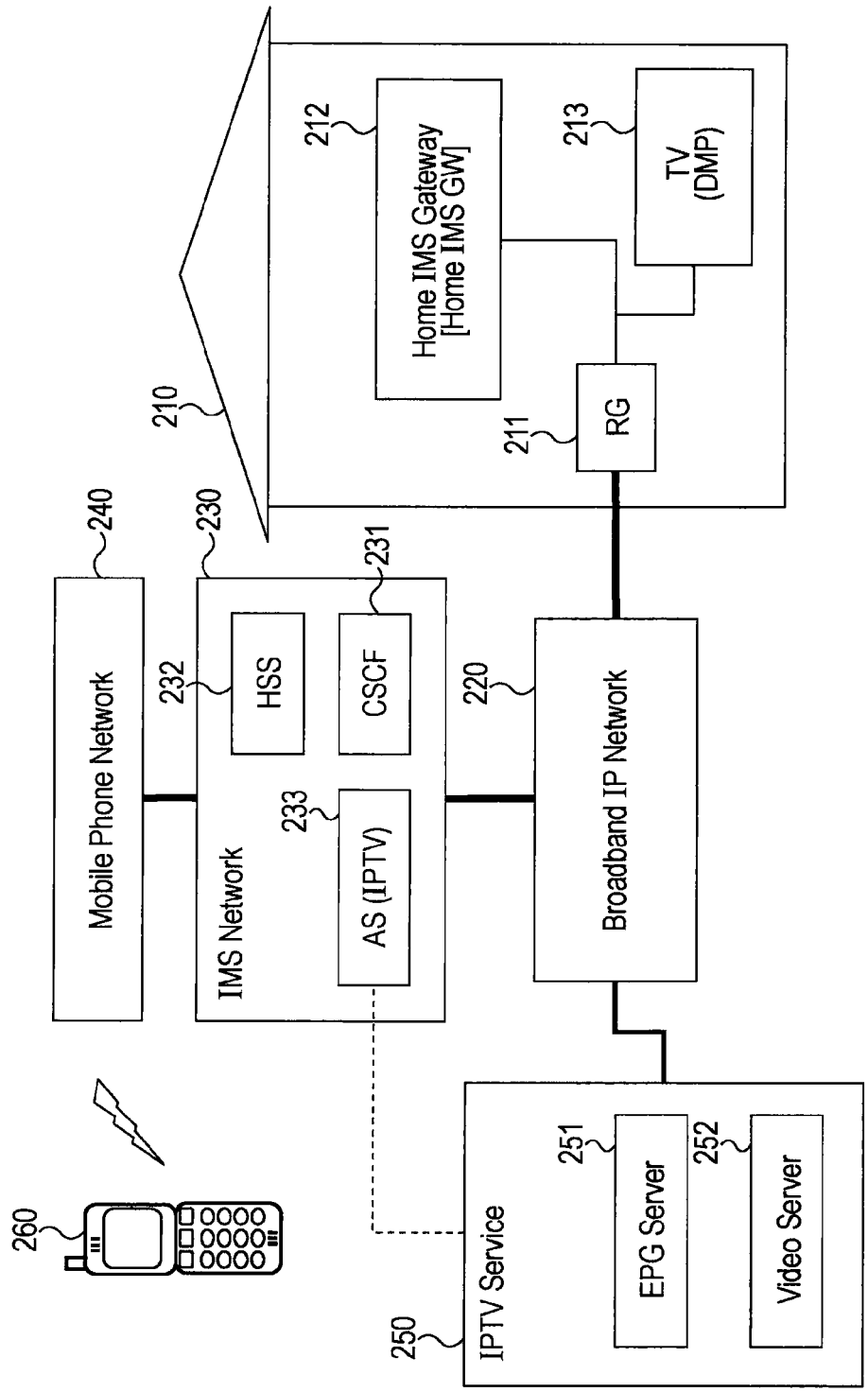
FIG. 3 is a diagram for explaining an example configuration of an information communication system according to the present invention.

An IMS network 230 shown in FIG. 3 includes a CSCF 231, an HSS 232, and an AS (IPTV) 233 as these individual functional elements, and it provides services to a cellular phone 260 via a mobile phone network 240.

The CSCF 231 performs user registration and session setting control on the basis of SIP (Session Initiation Protocol). Furthermore, it executes activation of service processes needed according to setting of a user profile registered in the HSS 232. The HSS 232 includes databases for management of user IDs used in IMS, management of profiles of services that each user subscribes to, management of authentication information, management as to whether use of each IMS service is allowed, and management of user movement. The AS 233 is a server that executes processes of individual services, and it is activated by the CSCF 231 in accordance with the service subscription status of each user to provide services to the user.

As described above, in IMS, a terminal for which a user ID has been set accesses the CSCF 231 to perform terminal registration and session setting control, services needed are activated according to setting of a user profile registered in the HSS 232, and the AS 233 actually executes processes of individual services.

For example, a representative example of a service that uses IMS is "Push To Talk". In "Push To Talk", a user terminal is configured to connect to an application server (AS) AS that executes a "Push To Talk" service in the IMS network 230, establish sessions with a plurality of members from the AS with registered group members, and perform conversation among the members via a relaying server using VoIP (Voice over IP).

In an IPTV trial viewing service, an AS for an IPTV service, set in the IMS network 230, is used. The AS (IPTV) 233 shown in FIG. 3 corresponds to an AS that executes the IPTV service. The AS (IPTV) 233 actually executes a service for the user terminal in cooperation with an IPTV service 250 as an entity that executes the IPTV service, i.e., an entity that provides content.

The IPTV service 250 includes an EPG server 251, which is a server that provides an EPG (Electronic Program Guide), i.e., program information guide such as a content list, and a video server 252, which is a server that provides video content, and it implements a service of providing a content list and a service of providing content to the user terminal by cooperation between the respective servers and the AS (IPTV) 233 of the IMS network 230.

Figure 1:
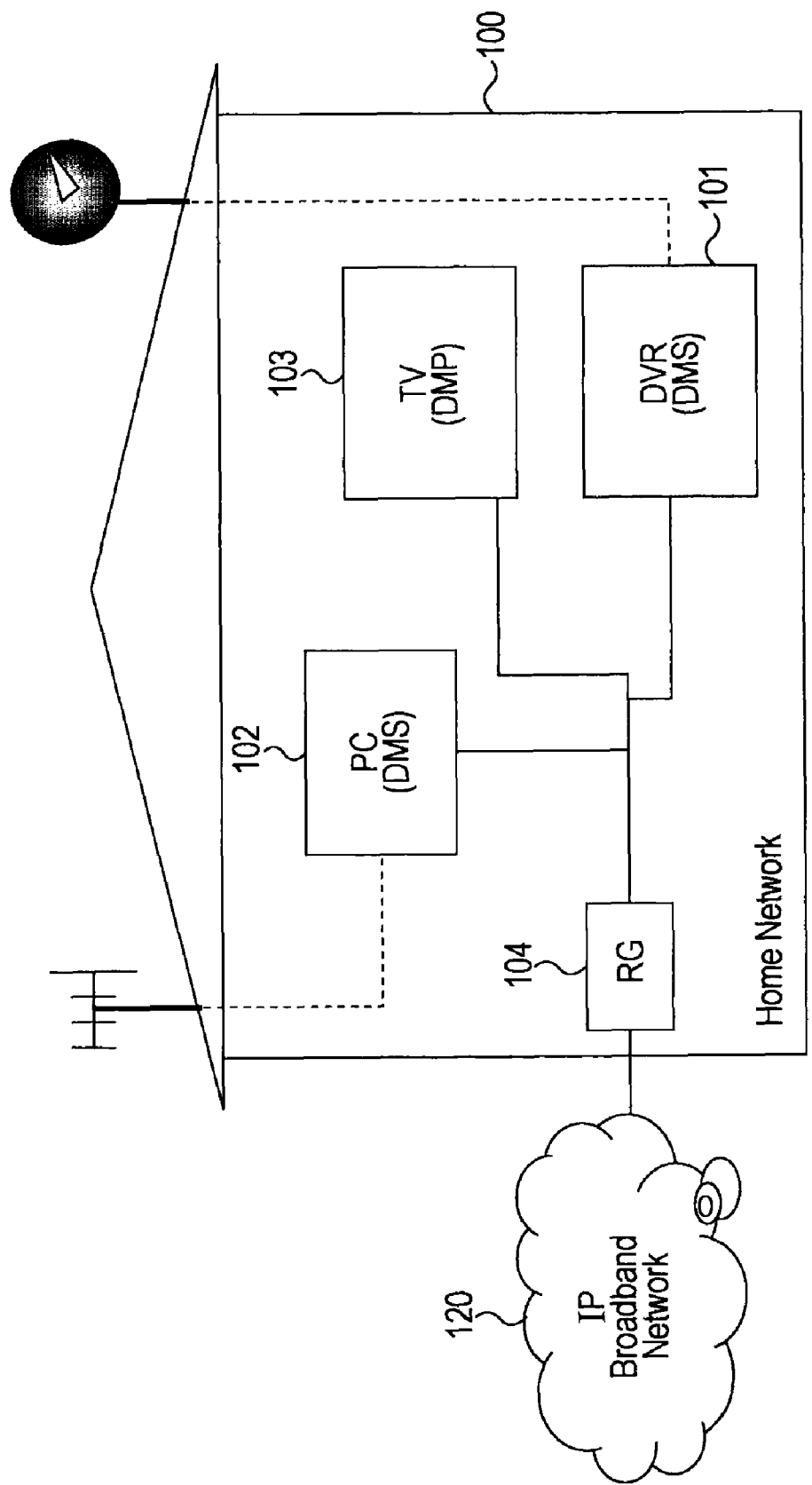
FIG. 1 is a diagram showing an example of a home network proposed by DLNA.
Figure 2:
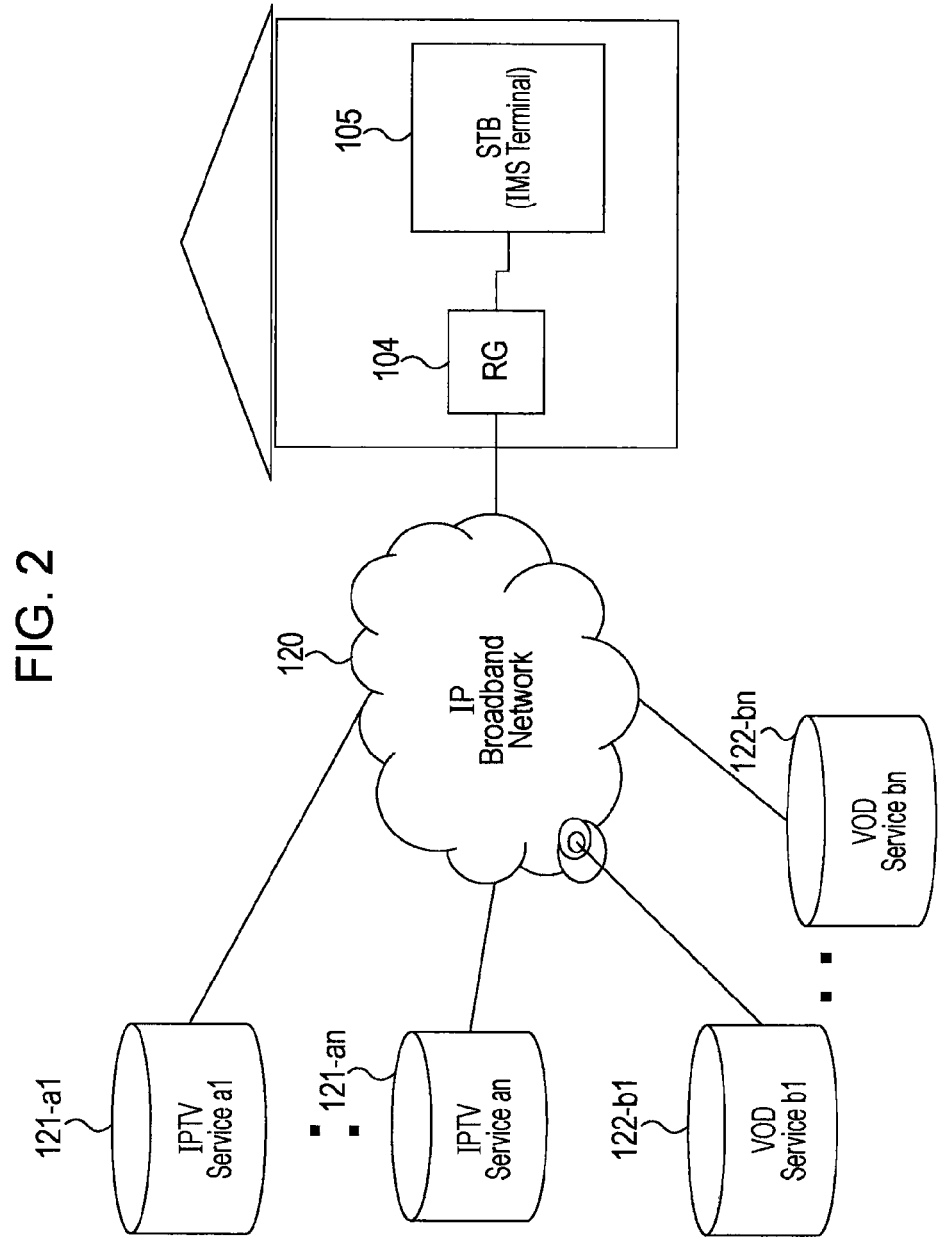
FIG. 2 is a diagram showing a schematic diagram of IPTV and VOD services.

In the system of the present invention, a home network 210, as its basic configuration, is configured by a conventional-type home network described earlier with reference to FIGS. 1 and 2, i.e., by existing DLNA (Digital Living Network Alliance) devices. FIG. 3 shows a residential gateway (RG) 211 used as a bridge, which is a network connecting device for connecting a device in the home network to an IP broadband network 221, a home IMS gateway 212 that executes a process for allowing a device in the home network 210 (e.g., a content playing device such as a TV (DMP) 213) to use a service provided by a server outside the home network, and the TV 213 as a digital media player (DMP), which is a client device that receives and plays content.

A broadband IP network 220 is a network, such as the Internet, that allows mutual communication among the IPTV service 250, the IMS network 230, and the home network 210.

Note that in the system of the present invention, the home IMS gateway 212 is set as a terminal that receives an IMS network service. In the home IMS gateway 212, an IMS user ID is set. That is, a user ID and a user profile of the home IMS gateway 212 are registered in the home subscriber subsystem (HSS) 232 of the IMS network 230.

The home IMS gateway 212 receives an IPTV service by executing a process similarly to a case where the cellular phone 260 executes an IPTV service. That is, it accesses the CSCF 231 and performs terminal registration and session setting control, activates services needed according to setting of the user profile registered in the HSS 232, and receives a service using the AS (IPTV) 233. In addition to the function of connecting to an IMS service as described above, the home IMS gateway 212 executes a gateway function for access by a DLNA device, such as the TV (DMP) 213 shown in the figure, to video content provided by the IPTV service 250. That is, the home IMS gateway 212 has the following functions:

(a) Function for connecting to an IMS service
(b) Gateway function

These functions are implemented using a network communication function, a basic configuration of an information processing apparatus, and software. The home IMS gateway 212 can be implemented on various devices connected to an existing home IP network having a network communication function.

Note that in a case where the home IMS gateway 212 executes a process of relaying video content or the like provided by the IPTV service 250 to a DLNA device, such as the TV (DMP) 213 shown in the figure, the following function is further provided:

(c) DMS Function as a Function for Executing a Content Providing Process

However, this function is not absolutely necessary, and such a configuration is possible that transmission and reception of content are executed by communication between a DMP as a DLNA device and an external server without the home IMS gateway 212 intervening therebetween. In this case, the home IMS gateway 212 need not have the DMS function. Specific process configurations of these will be described later.

By setting the home IMS gateway 212 having a function for receiving an IMS network service in the home network, it becomes possible for an existing DLNA device (e.g., the TV (DMP) 213 shown in the figure) to receive IPTV video content by a process substantially similar to receiving content provided from a DMS in the home network, i.e., the home IMS gateway 212.

It becomes possible for the TV (DMP) 213, which is a client device in the home network, to execute an IPTV service executed as a process of providing content from a device outside the home network, by a content using process similar to receiving content provided from a DMS in the home network, i.e., the home IMS gateway 212.

The home IMS gateway 212 implements a DMS (Digital Media Server) function as a content providing server of a DLNA device. An access is made from the TV 213 on which a DMP (Digital Media Player) is implemented to the home IMS gateway 212, so that the IMS gateway 212 can provide an IPTV service received via the IMS network 230 to the TV 213.

As described earlier, the home IMS gateway 212 can be implemented on various devices having a network communication function and connected to an existing home IP network. For example, it is possible to implement an IMS network service receiving function on a residential gateway (RG: Residential) supplied from an access line vendor that provides a network circuit, such as a telephone company or a cable TV company. In this case, the RG 211 and the home IMS gateway 212 shown in FIG. 3 are integrated.

Alternatively, in the conventional-type home network configuration described earlier with reference to FIG. 1, it is possible to implement an IMS network service receiving function on a DVR (Digital Video Recorder) or a PC that functions as a digital media server (DMS) as a device that provides content.

As described above, in the configuration of the present invention, since devices on which an IMS network service receiving function can be implemented are not limited, it becomes possible to support an IPTV service using the open Internet, and it also becomes possible to support an arbitrary home network configuration without limitation regarding network topology.

Hereinafter, an example configuration of the home IMS gateway and a process of receiving an IPTV service using the home IMS gateway will be described in detail. First, before describing the home IMS gateway, functional components of the DLNA guideline, to which DLNA devices conform, will be described with reference to FIG. 4.

Figure 4:
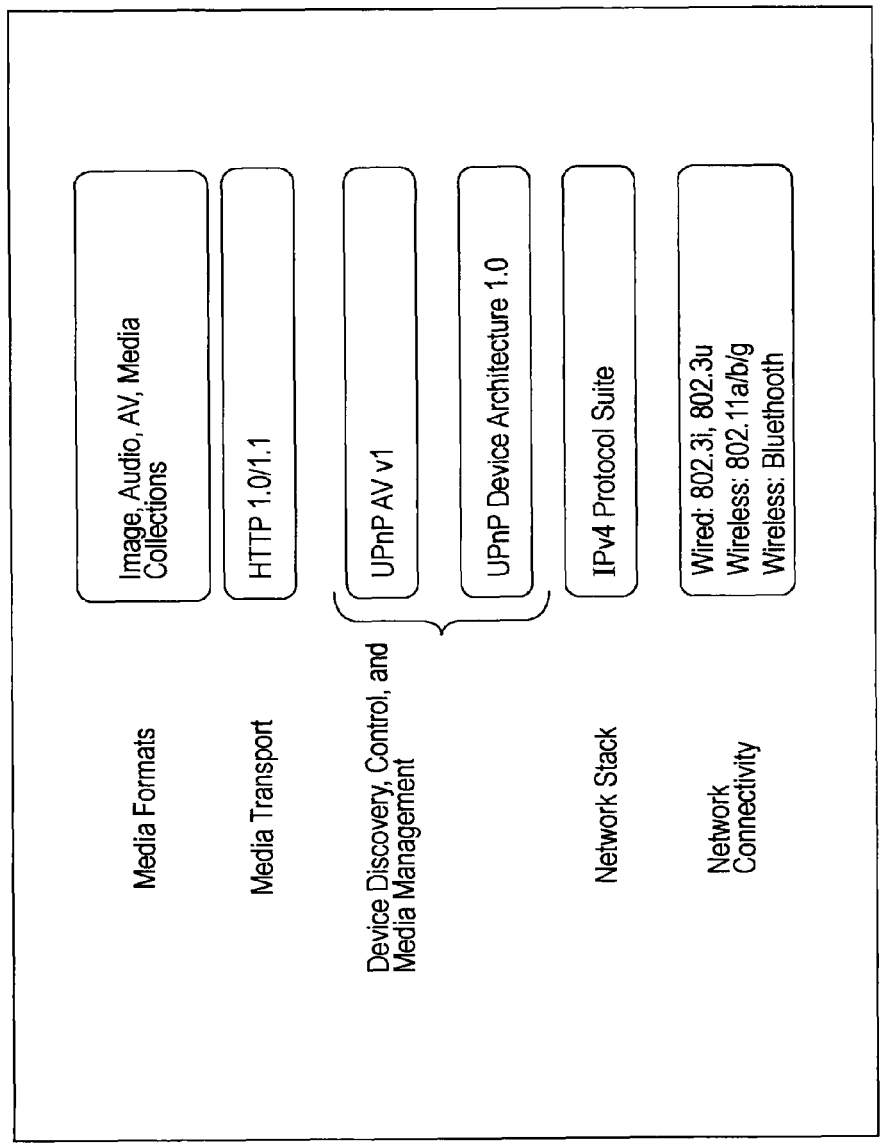
FIG. 4 is a diagram for explaining functional components according to the DLNA guideline, to which DLNA devices conform.

FIG. 4 shows functional components of the DLNA guideline. From the top row, configurations of a media format layer (Media Format), a media transport layer (Media Transport), a device discovery control and media control layer (Device Discovery, Control, and Media Management), a network layer (Network Stack), and a network connectivity layer (Network Connectivity) are defined. A home network device (DLNA device) executes data communication according to network protocols compliant with the DLNA (Digital Living Network Alliance) guideline according to the basic components shown in FIG. 4.

First, the network connectivity on the lowermost layer is a definition of a physical layer and a link layer of a home network. On a DLNA device, communication functions conforming to the IEEE 802.3u and 802.211a/b/g are implemented. However, the communication standard regarding home network infrastructure is not limited as long as IP connection is allowed, such as PLC (Power line communication).

In the network layer, the IPv4 protocol is used, and each DLNA device performs communication using TCP or UDP. In UPnP (registered trademark) Device Architecture 1.0 defined in the device discovery control and media control layer, SSDP (Simple Service Discovery Protocol) for device discovery, SOAP (Simple Object Access Protocol) for performing control, and so forth are defined, and UPnP AV is implemented over UPnP DA (UPnP Device Architecture). UPnP AV version 1 defines UPnP Media Server and UPnP Media Renderer. A DMS, which is a content providing server defined in DLNA, implements UPnP Media Server, and a DMP, which is a content playing device defined in DLNA, implements a controller of UPnP Media Server.

On UPnP Media Server, a main content directory service is implemented, so that a method of obtaining a content list and metadata is provided. By using the content directory service, the DMP, which is a content playing device defined in DLNA, obtains a content list streamed by the DMS, which is a content providing server defined in DLNA.

As a definition of the media transport layer, which is a next upper layer, it is defined that HTTP 1.0/1.1 is used for streaming playing. As a media format, in the case of video content, it is defined that content of Media Formats conforming to the MPEG2-PS profile defined by DLNA is transferred by streaming from the DMS to the DMP. For example, the DMP, which is a content playing device defined by DLNA, sequentially decodes and plays MPEG2-PS data received by streaming transmission, whereby the user can perform trial viewing of the content.

Figure 5:
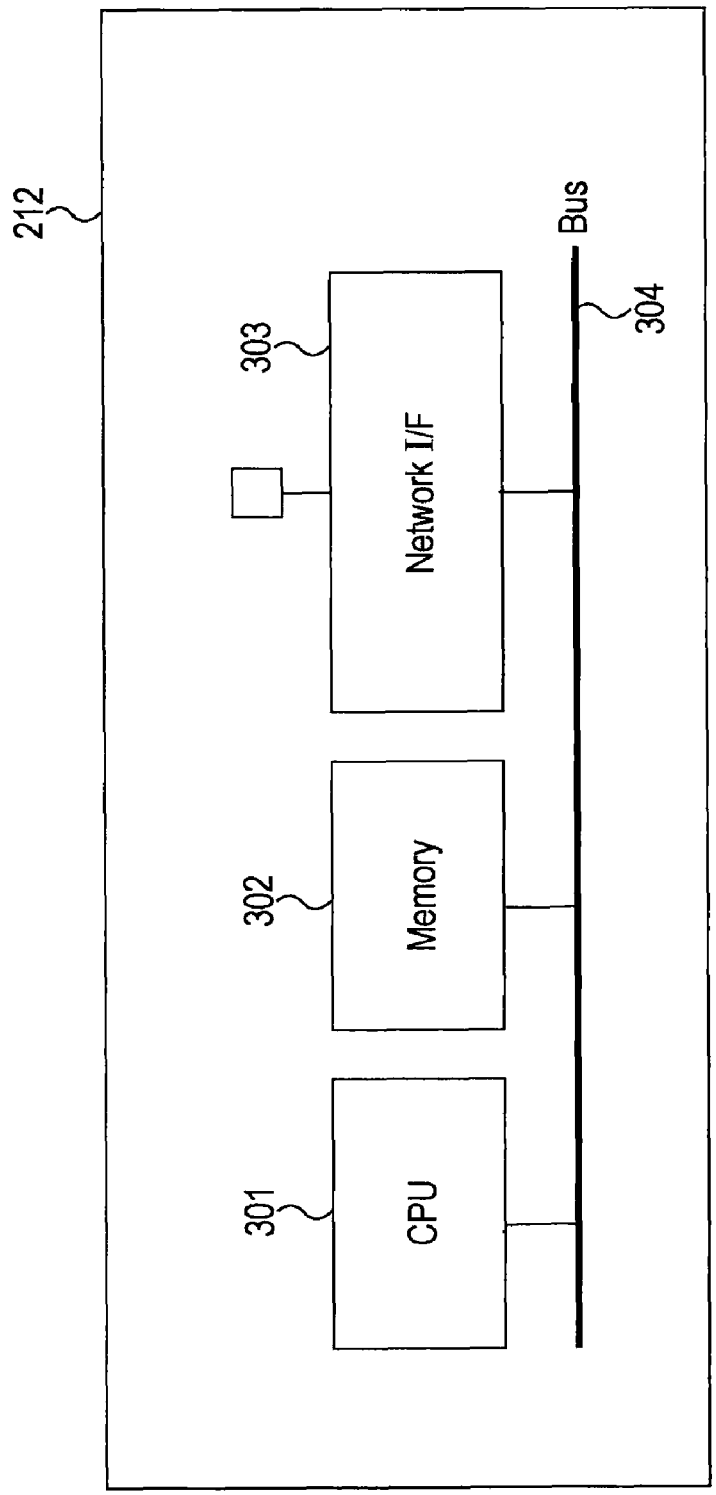
FIG. 5 is a diagram showing an example hardware configuration of a home IMS gateway.

FIG. 5 shows an example hardware configuration of the home IMS gateway 212 described with reference to FIG. 3. As described earlier, the home IMS gateway 212 has the following functions:

(a) Function for connecting to an IMS service
(b) Gateway function

These functions are implemented by a network communication function, a basic configuration of an information processing apparatus, and software. The hardware shown in FIG. 5 shows an example hardware configuration for implementing these functions (a) to (b).

As shown in FIG. 5, the home IMS gateway 212 is configured by a CPU 301 as a data processing unit that executes various types of software (computer programs), a memory 302 formed of a ROM as a program storage area, a RAM used as a work area or the like during execution of data processing, and so forth, a network I/F 303 as a network connecting unit, and furthermore, a bus 304 for transferring commands and data between these components.

The network I/F 303 is, for example, a network I/F for a wired LAN, such as IEEE 802.3u. An OS and other software programs are stored in a flash-ROM constituting the memory 302, and these programs are copied to a RAM constituting the memory 302 and executed. Furthermore, a user ID and various types of setting information needed in a process of establishing an IMS session are also saved in the flash-ROM constituting the memory 302.

Next, an example configuration of software modules of the home IMS gateway 212 will be described with reference to FIG. 6. As shown in the figure, the software modules can be classified into three types:

(1) Network modules
(2) Protocol modules
(3) Application modules (1) The network modules are modules in charge of controlling communication in an IP network.

(2) The protocol modules are modules in charge of protocol control for the individual functions of IMS and DLNA, i.e., performing control so that the IMS side executes communication according to a protocol defined on the IMS side and performing control so that that the DLNA side executes communication according to a protocol defined on the DLNA side. Since communication according to different protocols are executed on the IMS side and on the DLNA side, configurations supporting different protocols are provided.

(3) The application modules are modules that implement an actual gateway function using the protocol modules, i.e., that implements relaying between the DLNA side on the home network side and the IMS network, which is a network outside the home network.

In the figure, in order to clarify the distinction between functions used on the DLNA side on the home network side and functions used in the IMS network, which is a network outside the home network, areas are separated by a broken line, with software modules applied to the IMS/IPTV side shown on the left side of the broken line, and software modules applied to the DLNA side shown on the right side. Note, however, that the network modules are commonly used in both networks. Hereinafter, each of the modules will be described in detail.

First, in the network modules, an IPv4 TCP IP stack, and an Auto IP/DHCP (Dynamic Host Configuration Protocol) Client module for executing a process of setting an IP address, defined in UPnP DA, are implemented. The same network modules can be used by both IMS and DLNA.

Basically, it suffices for the home IMS gateway 212 to be connected to a home IP network, so that it is not absolutely necessary to separately set network I/Fs. Note, however, that in a case where it is configured as integrated with a residential gateway, a home network connection I/F and an external network connection I/F may be configured separately.

Since protocols that are used on the DLNA side on the home network side and protocols used in the IMS network, which is a network outside the home network, are currently different, the protocol modules are set individually in accordance with the individual protocols.

The DLNA side is composed of SOAP defined in UPnP DA, GENA (Generic Event Notification Architecture), Presentation Page and Device Description modules by an HTTP (Hyper Text Transfer Protocol) server, SSDP in charge of Device Discovery as a device discovery process, and an AKE module that executes authentication and key exchange (AKE) of DTCP-IP (Digital Transmission Content Protection-Internet Protocol) needed for implementing content in a home network.

The IMS side is composed of SIP/Module that establishes a session with an AS (Application Server), which is a server that provides an IMS service, and SOAP and GENA modules that perform message communication with the AS. Furthermore, on the IMS side, since communication over the open Internet is assumed, communication executing protocols, such as SIP and SOAP, are implemented over the TLS (Transport Layer Security) protocol defined in IETF RFC 2246 for security, so that the protocol setting is such that communication is executed under a secure environment.

One of the features of the home IMS gateway 212, which is an information processing apparatus of the present invention, is that it has such a configuration that a process of mapping an AS (IPTV service) of IMS as a UPnP device is executed using a function called Device Discovery Control as a device discovery process function used on a DLNA-side device. That is, the home IMS gateway 212 maps a server outside the home network as a virtual home network device. Specifically, by using UPnP Device Proxy Manager (refer to FIG. 6) or the like that is set as an application module on the home IMS gateway 212, the home IMS gateway 212 generates a UPnP Media Server instance corresponding to an AS (IPTV), which is an external server, and records it on a memory.

As described above, the home IMS gateway 212 maps and sets an AS (IPTV service) of IMS, which is an external device not existing in the home network, as a DMS of DLNA. This process is a process of making setting as if an AS (IPTV service) of IMS were a content providing server (DMS) existing in the home network.

In a case where a device discovery process according to UPnP is executed through the mapping process by a DLNA device in the home network, e.g., a DMP as a content playing executing device such as a TV, it becomes possible for the home IMS gateway 212 to notify the DMP that it has a service providing function based on the UPnP Media Server instance corresponding to the AS (IPTV). This makes it possible for the DMP to recognize, on the basis of this notification, the AS (IPTV service) of IMS as a device similar to a content providing server (DMS) in the home network. This makes it possible to receive a service of the AS (IPTV service) of IMS, which is an external network, by a process similar to reception of a service based on providing of content from within the home network.

Note that regarding the home IMS gateway 212, which is an information processing apparatus of the present invention, it is possible to make arbitrary setting as to whether a process of relaying content provided by the AS (IPTV service) of IMS is to be executed to a DMP as a content playing executing device in the home network. It is possible to make setting such that, without performing relaying of content, a DMP directly obtains content data from an external network by communication between a DLNA device (DMP as a content playing executing device) and a backend Video Server of the AS (IMS) of IMS. Specific process examples of these will be described later.

In a case where the home IMS gateway 212 performs relaying of content provided by the AS (IPTV service) of IMS, functions called Media Management, for example, a Content Directory service that obtains metadata of a content list, and a protocol for transferring video content, called Media Transport of DLNA, are implemented. In a configuration where the home IMS gateway 212 does not perform relaying of content provided by the AS (IPTV service) of IMS, it is not necessary to implement these functions, i.e., the Media Management functions, on the home IMS gateway 212.

Furthermore, it is also possible to make setting such that the home IMS gateway 212 does not perform a relaying process either for a content list request from a client device in the home network, i.e., a DMP as a content playing executing device, and such that a client device (DMP) is caused to issue a content list request directly to an external server such as an AS (IPTV service). In this configuration, it suffices for the home IMS gateway 212 to be configured to be capable of responding to a device discovery request from a client. Note that sending of a request from a client directly to an external server without passing it through the home IMS gateway 212 can be implemented by setting the URL of the external server, not the home IMS gateway, as a URL specified in [ControlURL] and [eventSubURL] of device information [Device Description] defined in Device Architecture of UPnP. By the home IMS gateway 212 providing device information [Device Description] having such setting to a client device, an external server, such as the AS (IPTV service), is set as a counterparty to which the client subsequently issues a content list request or various types of requests with reference to the device information. In this case, the model is such that the home IMS gateway is in charge of only device discovery, so that the load is further reduced. Note that it is also possible to set a URL of an external server instead of the home IMS gateway 212 also in URL [SCPDURL] for obtaining device information, defined in Device Architecture of UPnP.

The application modules, by using the protocol modules, execute a gateway function, i.e., a function of setting a communication environment between a DLNA device in the home network and a server outside the home network. The application modules are broadly classified into a set of modules that perform a mapping process for setting an AS (IPTV) service of IMS as a DMS of DLNA, and a set of modules that passes requests sent to the mapped DLNA DMS (which is actually an AS (IPTV service) of IMS) from, for example, a DMP, which is a content playing device in the home network, to an AS (IPTV) service of IMS.

The former set of modules that perform the mapping process are AS Discovery, ServiceManager, and UPnP Device Proxy Manager, and the latter modules that execute the request transferring process are UPnP Message Proxy and AKE Proxy.

As described above, the home IMS gateway 212, which is an information processing apparatus of the present invention, performs a process of mapping an AS (IPTV service) of IMS, which is an external device not existing in the home network, as a DMS of DLNA. Furthermore, the home IMS gateway 212 has a function of selectively mapping only a service entity [AS(IPTV)] selected by a user at the time of the mapping process.

That is, in a configuration where a plurality of ASs (IPTVs) of IMS/IPTV exist in the external network and each provides content, only an AS (IPTV) that a user has purchased and selected using an IMS charging system is selected and mapped to a DMS of DLNA.

Figure 6:
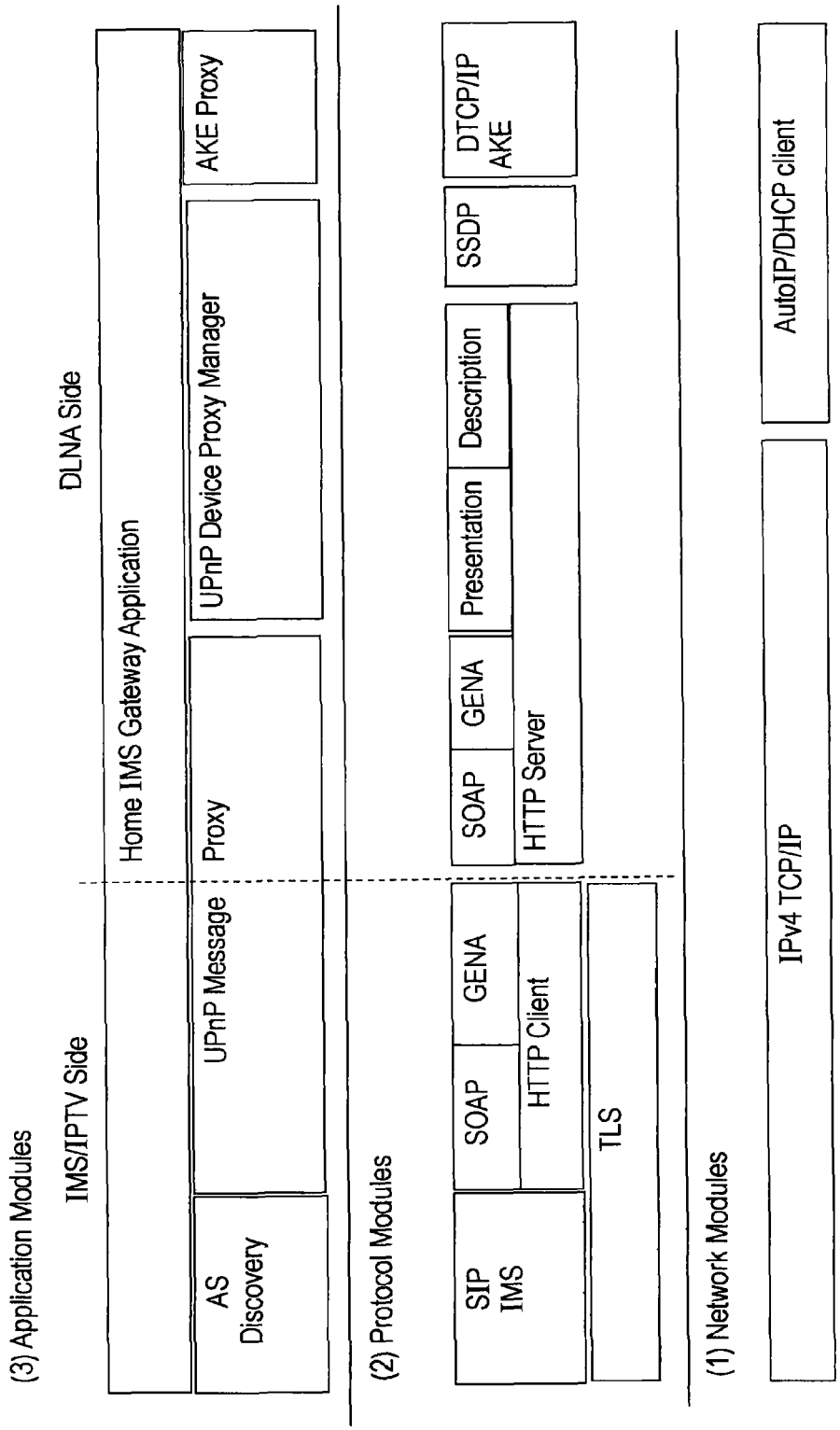
FIG. 6 is a diagram for explaining an example configuration of software modules of a home IMS gateway.

Among the application modules that perform the mapping process, AS Discovery shown in FIG. 6, which is a module on the IMS/IPTV side, executes a process of discovering an IPTV service provided by an IMS system, and UPnP Device Proxy Manager, which is a DLNA-side module, manages a list of ASs discovered and obtained by AS Discovery, and presents the user with this list to allow the user to execute a process of purchasing or selecting an AS (IPTV).

Specifically, the home IMS gateway 212, which is an information processing apparatus of the present invention, becomes an HTTP server, and by using the scheme of Presentation defined in UPnP DA, connects to a UPnP Control Point having an HTML browser thereon, the user selects a desired IPTV service from a displayed HTML screen using a browser function, and performs a procedure of subscribing to the service. Specifically, for example, by using a PC or TV set as a DLNA device in the home network having a browser function, it is possible to present a list owned by the home IMS gateway 212 on a display and to select an IPTV service.

Furthermore, in the procedure of receiving the IPTV service, by using UPnP Message Proxy as an executing module, it is possible to cause the request transferring process described earlier to cooperate with the charging system provided by the IMS system, and charging on the user is performed on the basis of customer information of the IMS user ID that has been set as an ID corresponding to the home IMS gateway 212.

As described above, on condition of the procedure of subscribing to the AS (IPTV) by the user, it becomes possible for the home IMS gateway 212 to perform selective mapping such as selecting an IPTV service for which the subscription procedure has been executed by the process of UPnP Device Proxy Manager, which is an application module, and to map the IPTV service to a DLNA DMS. Note, however, that in a case where an AS (IPTV) or the like exists for which it is not necessary to perform a subscription procedure, such as an AS (IPTV) that provides content free of charge, the process of subscription procedure by the user is not necessary, and user's selection is not a necessary condition for mapping.

The DMP as a content playing device, which is a DLNA device in the home network, interprets the AS (IPTV) for which the mapping process has been completed at the home IMS gateway 212 as a content providing server (DMS) in the home network, so that it becomes possible to receive the AS (IPTV) service.

UPnP Message Proxy, which is an application module, relays a message supplied from the DLNA DMP to the AS (IPTV). As protocols for this purpose, SOAP and GENA, equivalent to UPnP, are used, and the AS tries to achieve mutual compatibility by directly processing a message of a UPnP Media Server and Content Directory service defined in UPnP AV, by performing protocol conversion for AS (IPTV) at UPnP Message Proxy, or the like.

Note that the example configuration of software modules of the home IMS gateway 212 shown in FIG. 6 is a configuration of software modules in a case where the home IMS gateway is allowed to execute both communication according to communication protocols on the IMS/IPTV side and communication according to communication protocols on the side of DLNA in the home network, and the home IMS gateway 212 executes protocol conversion as needed in communication between the IMS/IPTV side and the DLNA side.

The configuration for the process of conversion of communication protocols may be such that it is executed by the home IMS gateway 212, or, for example, the configuration may be such that it is executed by an external server that executes communication directly with the side of the home IMS gateway 212, for example, an AS on the IMS side or a server that executes an IPTV service. As described above, in the configuration where necessary protocol conversion is executed at the external server, it suffices for the home IMS gateway 212 to have DLNA-side protocol modules and application modules. Note that in the case of such a configuration, the process of mapping the external server is executed by executing a device discovery process according to the SSDP protocol defined by DLNA.

Furthermore, in the process of obtaining a content list and metadata, executed by a client device in the home network, i.e., a DMP as a content playing executing device, in the embodiment described below, a method is employed in which an AS directly processes a UPnP Content Directory service. In the embodiment, a procedure for subscription to a service is executed by UPnP Control Point on which an HTML browser is implemented. Although this may be a DMP of a DLNA, it need not necessarily be a DMP of a DLNA, and a similar process can also be executed by a third party, for example, by an HTML browser of a personal computer. Also, in a case where an HTML browser is implemented on a cellular phone or the like, a purchase procedure can be executed similarly.

Furthermore, by making setting such that the home IMS gateway 212 itself has a user interface such as a display apparatus and an input unit, it is possible to input information input by the user by directly presenting a list obtained from an AS (IPTV) on the user interface, so that it is possible to execute a procedure for service subscription without depending on control by an HTML browser.

Note that various modes are possible as modes of the procedure for subscribing to an AS (IPTV). That is, various setting is possible, such as selection on the basis of each service as selection of an AS (IPTV) itself, or selection on the basis of each content provided by an AS (IPTV). In these cases, a scheme for selecting purchase by each content on the basis of setting of AS (IPTV) is provided by Presentation Page, selection information is registered on the IMS side as configuration data of user profile information, and the AS (IPTV) side provides content according to the registered information.

As described above, for the home IMS gateway 212, setting is possible both for a case where it is configured to execute a process of relaying content provided by an AS (IPTV service) of IMS to a DMP as a content playing executing device in the home network, and for a case where the process is not executed. In the latter case, processing of service logic at an application level, for example, data processing corresponding to each service, such as interpretation of a service provided by an AS (IPTV) service, or a process of conversion into a format understandable by a DMP, is not necessary. Furthermore, a process of temporary saving of content data or conversion is not necessary, either, so that it is possible to implement a home IMS gateway by a device with very inexpensive software and hardware configurations.

By making service logic processing by the gateway apparatus unnecessary, compared with a configuration in which these processes are executed, flexibility of extension of services can be improved. For example, there are cases where an AS (IPTV), which is an entity that provides content, performs addition of metadata of content or the like. In a configuration where a gateway apparatus executes processing of service logic, in order to make it possible for the gateway to interpret and process the added metadata, for example, updating of a program becomes necessary. However, in a home IMS gateway of the present invention, such a setting is possible that such processing is not executed, and it becomes possible to make various changes in service logic only by changes on the distribution service side without making changes at the gateway itself.

As described earlier, the following two configurations exist as modes of processing by the home IMS gateway 212:

(1) Configuration in which a process of relaying content provided by an AS (IPTV service) of IMS to a content playing executing device (DMP) in the home network is executed.

(2) Configuration in which a process of relaying content provided by an AS (IPTV service) of IMS to a content playing executing device (DMP) in the home network is not executed, and content is played by communication between DMP and AS (IPTV service).

In the above configuration (2) where content is played by communication between DMP and AS (IPTV service), content is transmitted directly from a content distribution service on the Internet to a DMP, which is a playing device. Thus, as opposed to a method in which content is temporarily downloaded to a home server and is then redistributed into a home, since it is possible to play content on demand, convenience for the user is also high. Furthermore, in the method in which transmission of content is not relayed, since duplicate transmission of content data does not occur in the home network, it is possible to prevent using a band in vain. Furthermore, limitation regarding the topology of the home network becomes absent, so that there exists an advantage that the variety of products on which a gateway function is implemented increases.

Hereinafter, a process sequence in a case where content is played by the process of the above (2), i.e., communication between DMP and AS (IPTV service), will be described with reference to sequence diagrams in FIGS. 7 to 10. The sequence diagrams in FIGS. 7 to 10 are diagrams for explaining sequences of the following processes.

Figure 7:
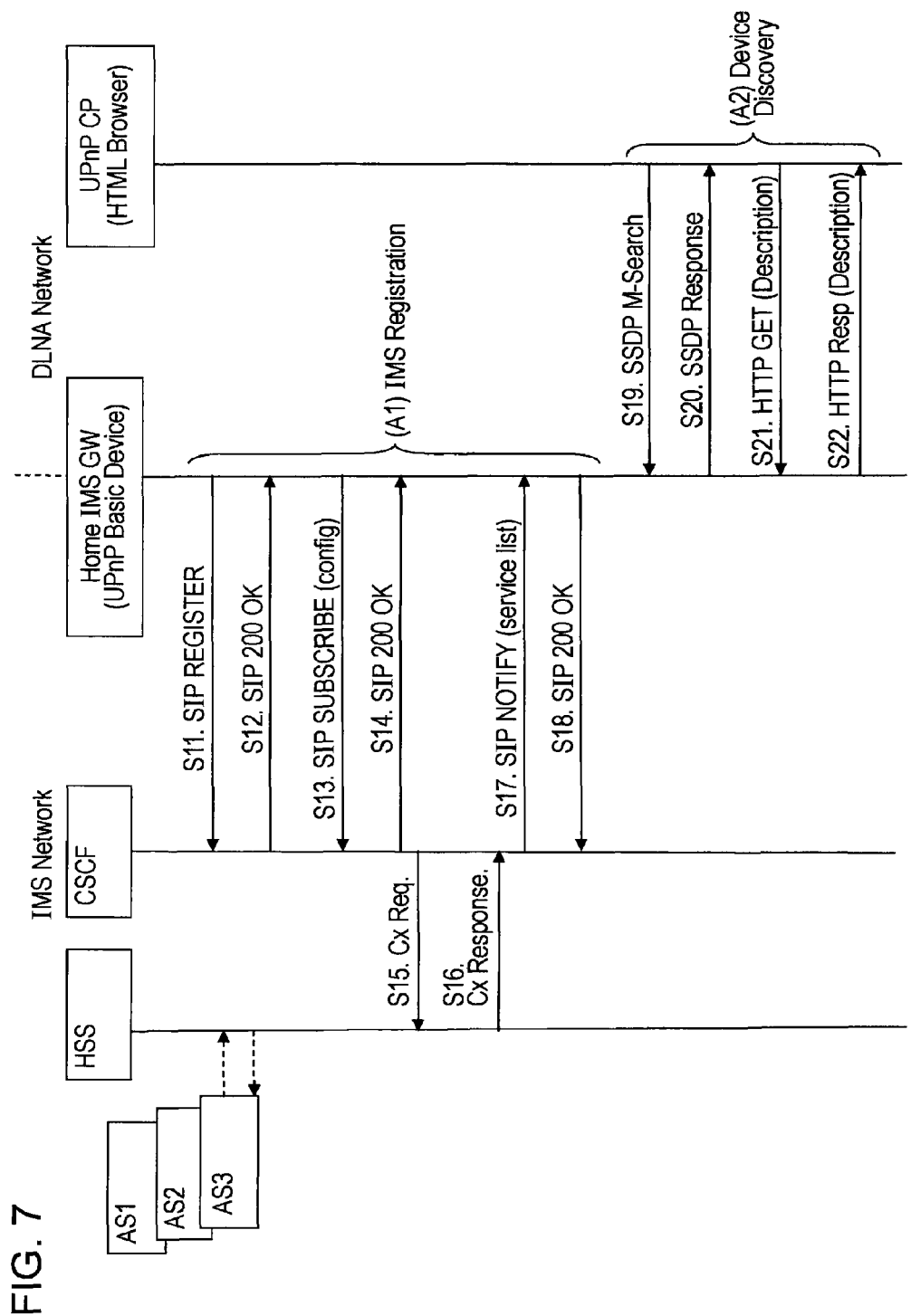
FIG. 7 is a diagram for explaining a sequence of a procedure for subscribing to an AS (IPTV).
Figure 8:
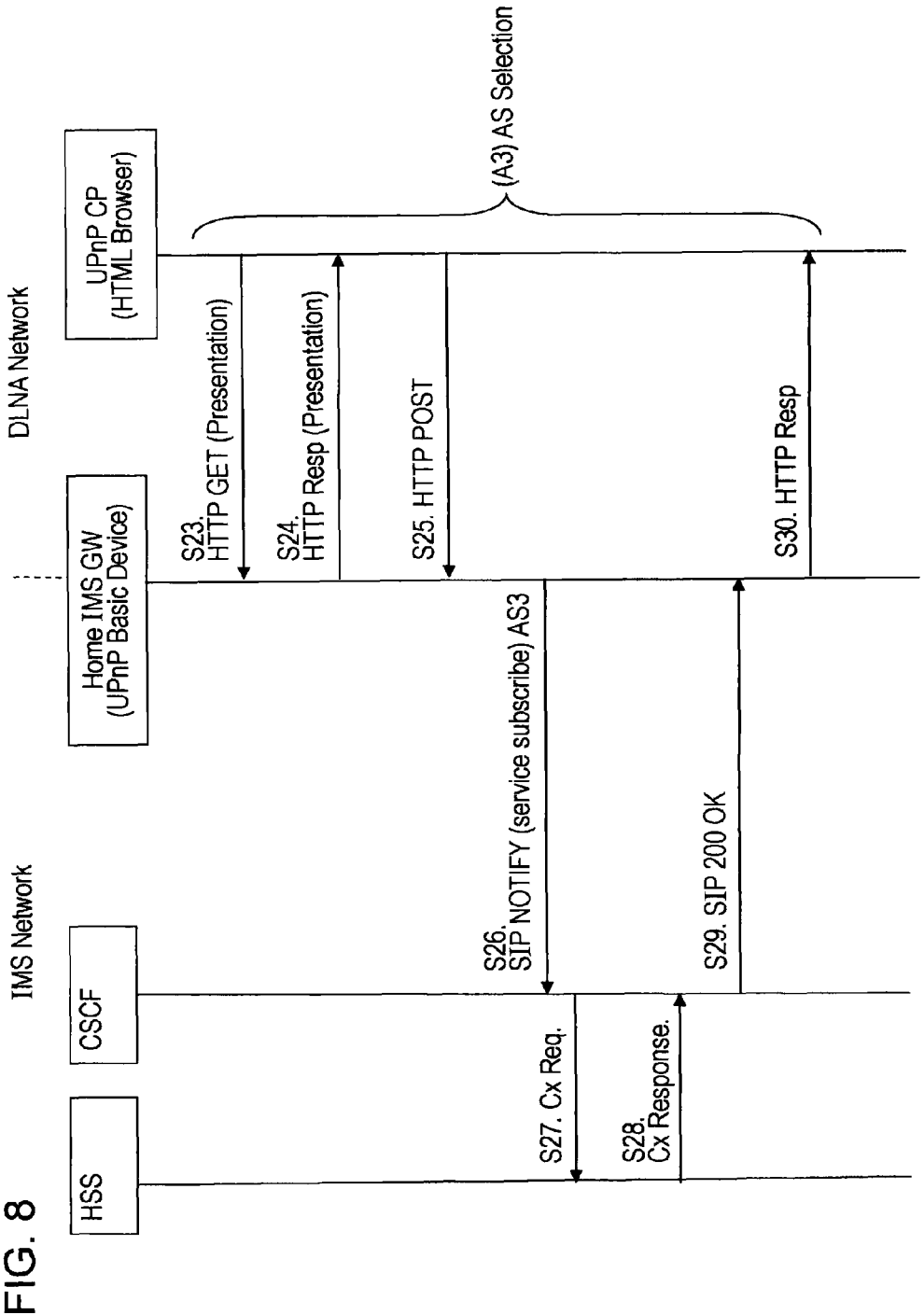
FIG. 8 is a diagram for explaining a sequence of a procedure for subscribing to an AS (IPTV).

(A) Sequence of procedure for subscribing to AS (IPTV) (FIGS. 7 and 8)
 (A1) IMS registration process
 (A2) Device discovery process
 (A3) AS (IPTV) selection process
(B) Sequence of usage of content provided by AS (IPTV) (FIGS. 9 and 10)
 (B1) Device discovery process
 (B2) Content list obtaining process
 (B3) Authentication and key exchange process
 (B4) Content streaming process First, with reference to FIGS. 7 and 8, the sequence of the procedure for subscribing to an AS (IPTV) will be described. FIGS. 7 and 8 show the following components from the left side:

(1) Three IPTV services AS1, AS2, and AS3 as application servers that execute content providing services supporting IPTV in an IMS network (2) HSS having databases for management of user IDs used in IMS, management of profiles of services that each user subscribes to, management of authentication information, management of whether use of each IMS service is allowed, and management of user movement (3) CSCF that performs user registration and session setting control on the basis of SIP (Session Initiation Protocol) in an IMS network (4) Home IMS gateway (5) HTML browser (user interface) as a UPnP control point Furthermore, [Cx], [SIP], [SSDP], and [HTTP] shown in individual steps indicate protocols applied to individual communications.

The sequence of the procedure for subscribing to an AS (IPTV), shown in FIGS. 7 and 8, can be divided into the following three phases:
 (A1) IMS registration process
 (A2) Device discovery process
 (A3) AS (IPTV) selection process Hereinafter, each of the processes will be described.

(A1) IMS Registration Process

In the IMS registration process, which is the first phase, first, in step S11, the home IMS gateway sends an IMS user ID preset to the home IMS gateway to a CSCF of the IMS network, and in step S12, the home IMS gateway receives an acknowledgement of registration and performs registration to the IMS network. Then, in step S13, configuration information (config) is presented to the CSCF, and in step S14, an acknowledge response is received.

In step S15, the CSCF issues a request for available service information registered in association with the IMS user ID to the HSS having a database for managing user profile information and obtains the available service information (step S16), and in step S17, the CSCF sends the obtained list of available services to the home IMS gateway. In step S18, the home IMS gateway sends an acknowledgement of receipt to the CSCF.

The home IMS gateway obtains a list of available services as described above and stores it in a memory. The home IMS gateway generates an HTML document from the list of IPTV services obtained as described above, and prepares for the subsequent setting of AS by the HTML browser.

(A2) Device Discovery Process

The second phase is the device discovery process. At the initial stage, the AS to use is not specified by the user. Thus, at this stage, the home IMS gateway has not mapped the AS (IPTV) as a DLNA DMS, so that the DMP as a content playing device in the home network cannot interpret the AS (IPTV) as a DMS and receive content.

As described earlier, when selection of an AS (IPTV) is executed, the home IMS gateway becomes an HTTP server, and by using the scheme of Presentation defined in UPnP DA, it connects to UPnP Control Point implemented on an HTML browser and selects a desired IPTV service from an HTML screen displayed by the user using a browser function. (A2) Device discovery process shown in FIG. 7 is a sequence of this process.

The user who executes selection of an AS (IPTV) discovers that the home IMS gateway is connected on the home network by the process according to the device discovery protocol defined in UPnP from UPnP Control Point, for example, a PC or the like having a browser function, i.e., by sending SSDP M-Search in step S19 and receiving SSDP M-Response as a response thereto in step S20. Steps S21 and S22 are steps of requesting and receiving specific device information.

(A3) AS (IPTV) Selecting Process

FIG. 8 shows the sequence of the AS (IPTV) selecting process that is executed subsequently. In this phase, the user views the AS (IPTV) service list obtained in the first phase by the home IMS gateway from the UPnP Control Point of a PC or the like, and executes service (AS) selection.

First, in steps S23 and S24, to the home IMS gateway as an HTTP server, on the basis of HTTP GET, an HTML document is obtained and an HTML page is displayed. In the screen, the AS (IPTV) service list is displayed.

The user selects an AS (IPTV) from which the user desires to receive a service or selects content from the list, and then, in step S25, the request information is input to the home IMS gateway, and in step S26, the home IMS gateway requests subscription to the service to CSCF of IMS. In step S27, on the basis of the service subscription request at the home IMS gateway, the CSCF executes registration of information corresponding to the service subscription request to the HSS as registration information associated with the user. Upon completion of the service subscription registration process, in step S28, a notification of a process completion response is sent from the HSS to the CSCF, is sent from the CSCF to the home IMS gateway in step S29, and is further sent to an apparatus having a user interface, such as a PC that is UPnP Control Point, and is acknowledged by the user in step S30.

Note that in (A3) AS (IPTV) selecting process, there are cases where, for example, a charging process or the like is performed. In this case, input and communication of information needed for the charging process are executed.

As described above, (A) the sequence of the procedure for subscribing to AS (IPTV) is composed of the following three processes:
 (A1) IMS registration process
 (A2) Device discovery process
 (A3) AS (IPTV) selecting process By completing these processes, the process of subscribing to an AS (IPTV) is completed.

Upon completion of the AS (IPTV) subscription procedure, the home IMS gateway executes mapping so that the selected AS (IPTV) becomes a DLNA DMS, thereby making setting such that the DMP as a content playing device in the home network can interpret the selected AS (IPTV) as a DMS and receive content. That is, by using UPnP Device Proxy Manager and so forth shown in FIG. 6, the home IMS gateway generates an instance of UPnP Media Server corresponding to the selected AS (AS3 in the example), and records the instance in a memory.

Through the mapping process, the AS (IPTV) as an IMS application server existing outside the home network is dealt with similarly to a DMS (DLNA Media Server) similar to a content providing server in the home network, and it becomes possible to use the AS (IPTV) from a DMP (DLNA Media Player), which is a content playing device in the home network.

Hereinafter, with reference to FIGS. 9 and 10, a sequence of usage of AS (IPTV) provided content by a DMP, which is a content playing device in the home network, will be described.

Figure 9:
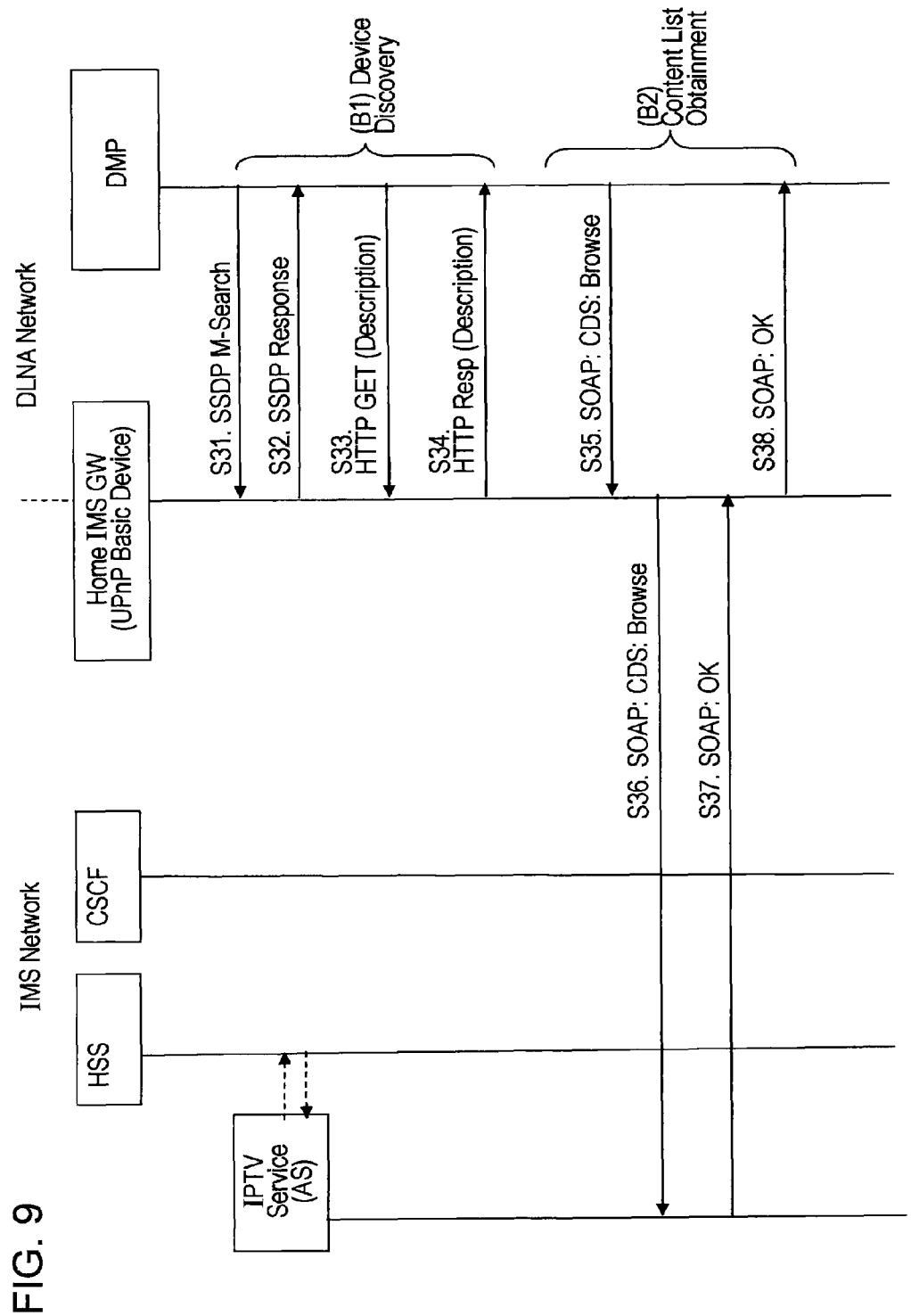
FIG. 9 is a diagram for explaining an example of a sequence of using content provided by an AS (IPTV).
Figure 10:
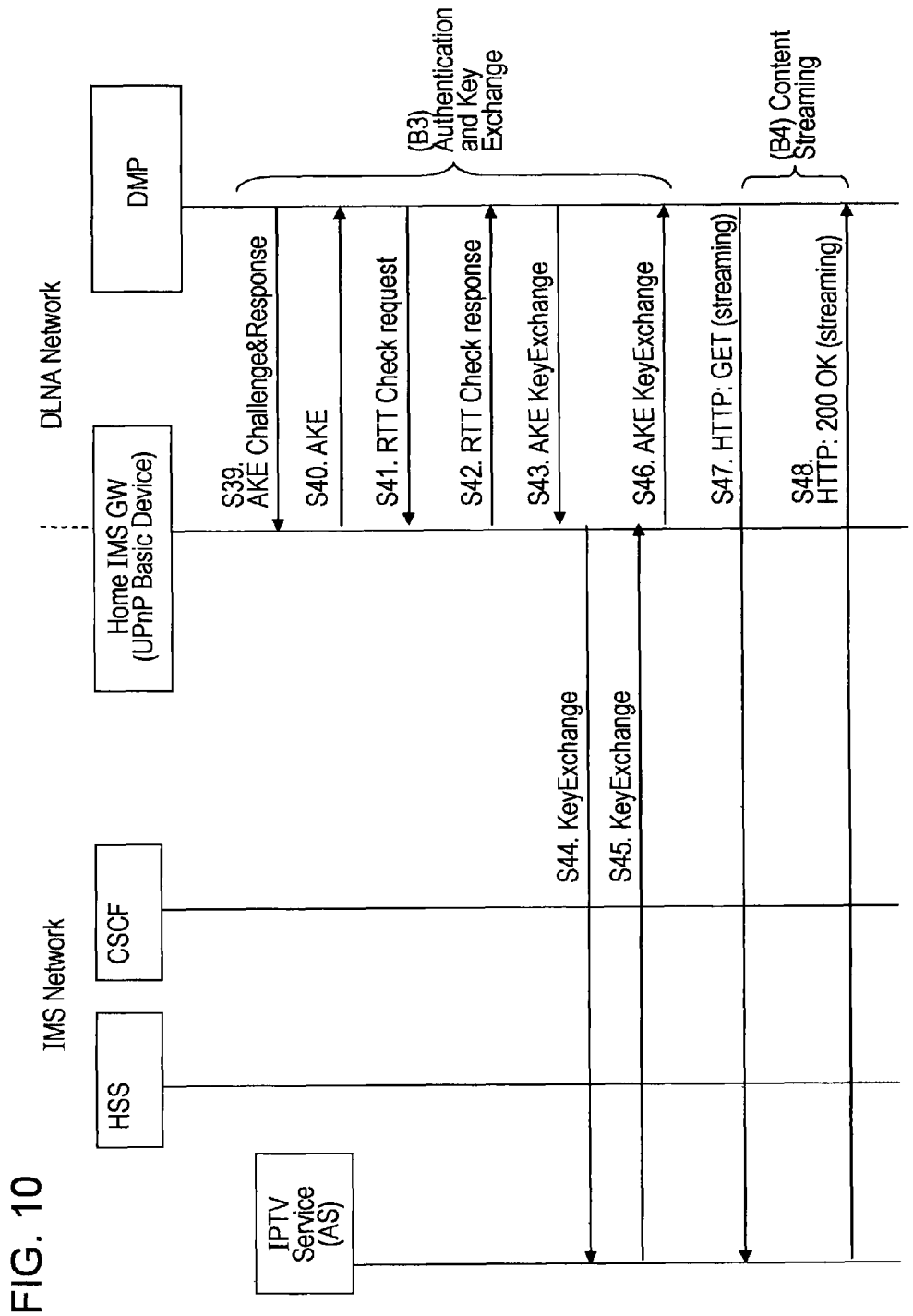
FIG. 10 is a diagram for explaining an example of a sequence of using content provided by an AS (IPTV).

FIGS. 9 and 10 shows the following components from the left side:

(1) IPTV service (AS) (content providing entity)
(2) HSS having databases for management of user IDs used in IMS, management of profiles of services that individual users subscribe to, management of authentication information, management of whether use of each IMS service is permitted or not, and management of user movement
(3) CSCF that controls user registration and session setting on the basis of SIP (Session Initiation Protocol) in an IMS network
(4) Home IMS gateway
(5) DMP (DLNA Media Player), which is a content playing device in a home network.

Note that (1) IPTV service (AS) is either an IPTV service alone or a combination of an IPTV service and an AS, and either mode is possible. Furthermore, [SSDP], [HTTP], [SOAP], and [AKE] shown in individual steps indicate protocols applied to individual communications.

The sequence of usage of AS (IPTV) provided content, shown in FIGS. 9 and 10, can be divided into the following four phases:

(B1) Device discovery process
(B2) Content list obtaining process
(B3) Authentication and key exchange process
(B4) Content streaming process Hereinafter, each of these processes will be described.

(B1) Device Discovery Process

The first process is the device discovery phase. By the AS subscription sequence described earlier with reference to FIGS. 7 and 8, the home IMS gateway has already mapped an AS (IPTV) as a DLNA DMS, and it has been made public to each device DLNA device in the home network that the AS (IPTV) can be used as a DLNA DMS. That is, all the DMPs connected to the home network, which are content playing devices, can obtain AS (IPTV) information as DMS from the home IMS gateway by the device discovery sequence defined in UPnP DA. The device discovery sequence is a process of steps S31 to S34.

The DMP, which is a content playing device, discovers the AS (IPTV) set as a DMS, by the process according to the device discovery protocol defined in UPnP, i.e., by sending SSDP M-Search to the home IMS gateway in step S31 and receiving SSDP M-Response from the home IMS gateway as a response thereto in step S32. Steps S33 and S34 are steps of requesting and receiving specific device information.

Note that in the device discovery process, the home IMS gateway provides information based on the UPnP Media Server instance corresponding to the AS (IPTV), generated by the home IMS gateway in the mapping process, i.e., server information corresponding to the AS (IPTV), to the DMP, which is a content playing device. By receiving this information, the DMP interprets the AS (IPTV) as being a content providing server (DMS) in the home network.

(B2) Content List Obtaining Process

The second process is a process of obtaining a content list from the AS (IPTV) set as a DMS. As in the example already shown in the AS subscription sequence, it is assumed that the home IMS gateway has already established a session with the IMS network. In a case where a session is not established or is disconnected, a reconnection is performed using a request for obtaining content or the like as a trigger. By establishing a session with the IMS network, information of the AS for which subscription has been completed has already been obtained.

In step S35, the DMP issues a Browse action of UPnP Content Directory Service to the AS (IPTV) set as a DMS that has been discovered in the first phase. Upon receiving the Browse action from the DMP, in step S36, the home IMS gateway relays this request and transfers it to the IPTV (AS).

The IPTV (AS) interprets the content of the Browse action, generates a list of video content from a backend electronic program information storage server (EPG server) or the like, and sends a response to the DMP via the home IMS gateway (steps S37 and S38). For example, in a case where the content list has a hierarchy, a plurality of Browse actions are issued. Note that as defined in UPnP Content Directory Service, a content list is represented by an XML document called DIDL-Lite, conforming to XML Schema, and resource information (URI) of video data of each content indicates video content provided by a backend Video Server of AS.

Note that as described earlier, such setting is possible that the home IMS gateway does not execute the process of relaying a content list request from a DMP, and a content list request is issued directly from a client device (DMP) to an external server such as an AS (IPTV service). For this purpose, URLs specified by [controlURL] and [eventSubURL] of device information [Device Description] defined in UPnP Device Architecture are set to be a URL of an external server, not the home IMS gateway. By the home IMS gateway providing device information [Device Description] having such URL setting to a client device, a counterparty to which the client subsequently issues a content list request or various types of request with reference to the device information is set to an external server such as an AS (IPTV service).

(B3) Authentication and Key Exchange Process

The third phase is authentication and key exchange. In a case where copy-protected content is transmitted, a DLNA encrypts the content according to DTCP-IP and transmits the content. Also in streaming from an AS (IPTV) video server, encryption conforming to DTCP-IP is performed to send encrypted content.

A key applied to content encryption is generated by an authentication and key exchange (AKE) process according to definition of DTCP-IP. As shown in FIG. 6, the home IMS gateway has a function of DTCP-IP AKE Proxy, and at the time of content reception, a DMP, which is a content playing device, performs authentication and key exchange with the home IMS gateway having a DMS that the DMP recognizes as a content providing service entity.

The setting of a content resource URI set in a list obtained in (B2) content list obtaining process is such that it includes an IP address of an AS video server. An address as a subject of the authentication and key exchange process needed to execute obtaining of content, i.e., the AKE processes, is set to the home IMS gateway. That is, the DMP performs authentication and key exchange with the home IMS gateway in which a DMS instance recognized as a content providing service entity is registered.

Note that although the subject of execution of authentication and key exchange at the DMP is often an entity that sends encrypted content, i.e., an IP address of an AS video server included in a content resource URI, in the configuration of the present invention, the subject of the AKE processes executed by the DMP at the time of a request for obtaining content included in the content list provided to the DMP in (B2) content list obtaining process is set to be the home IMS gateway.

This becomes possible, for example, by including, in metadata associated with content, metadata with which setting is such that the subject of AKE is the home IMS gateway. The configuration may be such that the setting of content list that the home IMS gateway receives from the IPTV service (AS) is a list set in advance as described above or such that metadata is added or changed at the home IMS gateway. Alternatively, the configuration may be such that at the time when the home IMS gateway provides a content list to the DMP, a notification that the subject of AKE is the home IMS gateway is executed.

The authentication and key exchange process is executed according to an authentication and key exchange (AKE) process sequence defined in DTCP-IP.

In the configuration of the present invention, through the processes of steps S39 to S46 shown in FIG. 10, i.e.;

S39: AKE Challenge&Response
S40: AKE
S41: RTT (Round Trip Time) Check request
S42: RTT Check response
S43: AKE Key Exchange
S44: Key Exchange
S45: Key Exchange
S46: AKE Key Exchange the authentication and key exchange between the DMP and the home IMS gateway are completed.

In the course of the authentication and key exchange process, in order to confirm that the home IMS gateway, which is the subject of AKE, is in the proximity of the DMP, confirmation of TTL (Time To Live) of an IP packet and confirmation of a response time are executed as RTT measurement in steps S41 and S42.

Furthermore, steps S44 and S45 are processes that are characteristic of the configuration of the present invention, and these are processes of passing a key shared between the home IMS gateway and the DMP in the AKE sequence to the IPTV service (AS) so that the key applied as an encryption key is shared between the IPTV service (AS) as a content providing entity and the DMP as a content using entity. By adding the processes of steps S44 and S45, the IPTV service (AS) as a content providing entity and the DMP as a content using entity can share the encryption key. Here, the IPTV service (AS) is a legitimate service that is allowed to share the key, and steps S44 and S45 are performed by secure communication.

(B4) Content Streaming Process

The last, fourth phase is a content streaming process. In step S47, the DMP, which is a content playing device, applies a resource URL obtained in the preceding (B2) content list obtaining process, and issues a content request based on HTTP GET to request HTTP streaming.

The video server of the IPTV service (AS) encrypts content data using the key shared with the DMP in the preceding AKE phase, and in step S48, starts streaming transmission of content to the DMP, which is a DLNA device in the home network.

The DMP, which is a content playing device in the home network, decrypts the data received from the IPTV service (AS) by applying the encryption key shared with the IPTV service (AS) in the preceding AKE phase to decode the data, and thereby executes content playing.

(B3) Authentication and key exchange process
(B4) Content streaming process

The process configuration of the present invention is a process conforming to streaming playing by DTCP-IP defined in DLNA, except in that in the third and fourth phases, an IP address used by the AKE module is set to be the home IMS gateway, which is an entity different from the server as a content providing entity.

Figure 11:
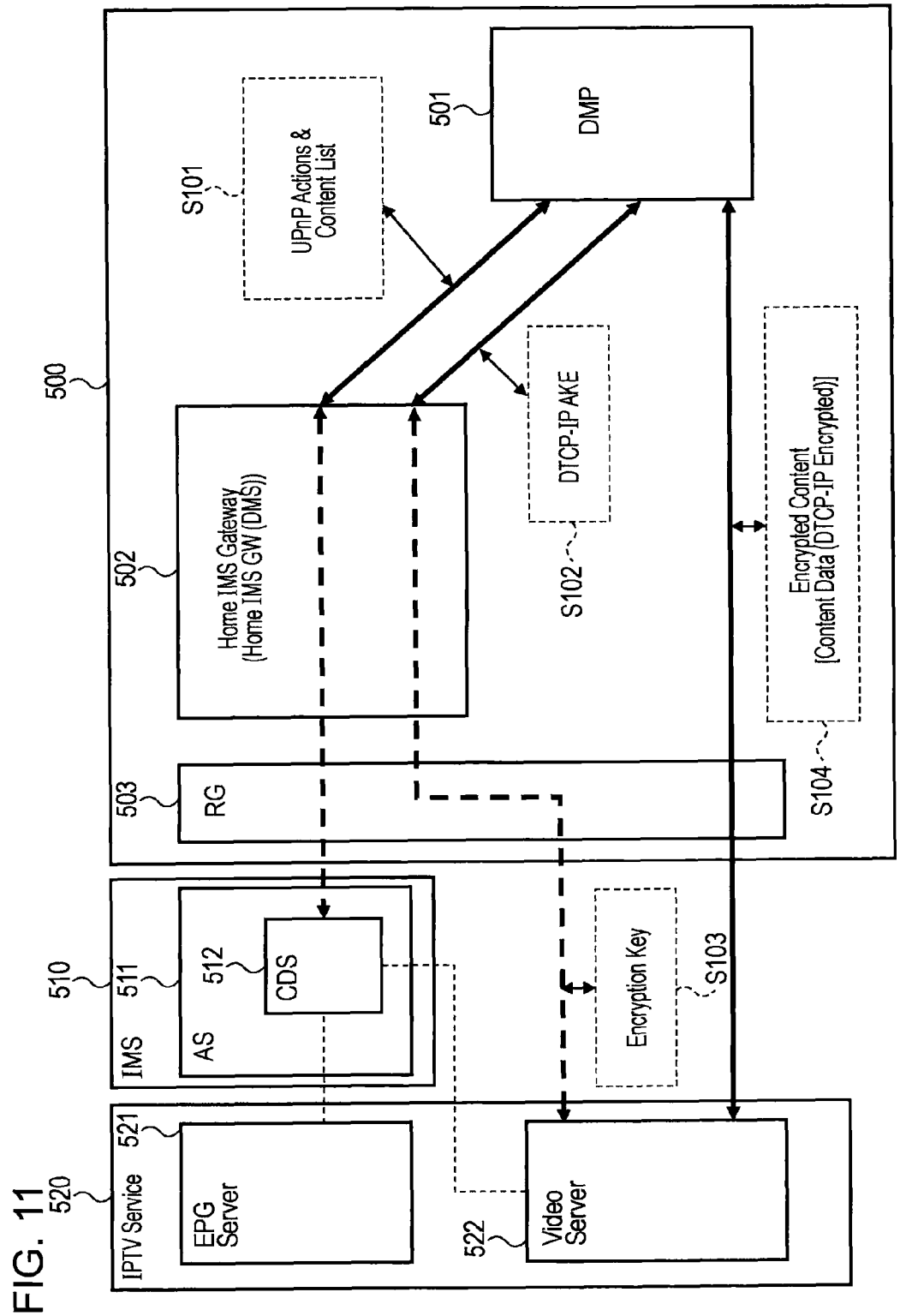
FIG. 11 is a diagram for explaining an overview of data communication in a content using process.

An overview of data communication in the content using process described with reference to FIGS. 9 and 10 will be described with reference to FIG. 11. In FIG. 11, as devices in a home network 500, a DMP 501 as a content playing device, a home IMS gateway 502, and a residential gateway (RG) 503 are shown. Furthermore, as a configuration outside the home network 500, an IP multimedia subsystem (IMS) 510 and an IPTV service 520 are shown.

As described earlier with reference to FIG. 3, the IP multimedia subsystem (IMS) 510 is the base of wireless communication infrastructure for cellular phones, which is being developed by 3GPP (3rd Generation Partnership Project), which is a project for standardizing 3rd generation mobile communication systems. With a functional element called CSCF (Call Session Control Function) as a core, it is configured by functional components such as Home Subscriber Subsystem (HSS) and Application Server (AS). FIG. 11 shows an application server (AS) 511. The application server (AS) 511 includes a CDS (Content Directory Service) 512 as a directory service executing section that performs processes such as registration of a function of a service providing server.

The IPTV service 520 has an EPG server 521, which is a server that provides EPG (Electronic Program Guide), which is a program information guide such as a content list, and a video server 522, which is a server that provides video content, and it implements a content list providing service and a content providing service to the DMP 501, which is a user terminal, by cooperation between the respective servers and the CDS 512 of the AS (IPTV) 511.

A basic process flow in a case where the DMP 501, which is a content playing device in the home network 500, obtains content from the IPTV service 520 outside the home network will be described. Through the AS subscription sequence described earlier with reference to FIGS. 7 and 8, the home IMS gateway 502 has already mapped the IPTV service (AS) as a DLNA DMS.

First, in step S101, the DMP 501 executes device discovery as a UPnP action to obtain information of an AS (IPTV) set as a DMS from the home IMS gateway 502. In the device discovery process, the home IMS gateway 502 provides the DMP 501, which is a content playing device, with information based on a UPnP Media Server instance corresponding to the AS (IPTV) generated by the home IMS gateway 502 in the mapping process. By receiving this information, the DMP 501 interprets the AS (IPTV) as being a content providing server (DMS) in the home network.

Furthermore, the DMP 501 issues a Browse action of Content Directory Service of UPnP to the AS (IPTV) set as a DMS. Upon receiving the Browse action from the DMP 501, the home IMS gateway 502 relays the request to the AS 511 (CDS 512). The AS 511 (CDS 512) obtains a list of video content provided by the EPG server 521 of the IPTV service 520, and the home IMS gateway 502 sends a content list to the DMP 501 as a response.

Note that as described earlier, in the content list, as metadata, a content URL applied to obtaining of content, and subject device information of the authentication and key exchange (AKE) processes executed as a presupposition of content obtaining are recorded, and the subject device information of the key exchange process (AKE) is set to the home IMS gateway 502. Alternatively, the setting may be such that, without using content metadata, the home IMS gateway 502 notifies the DMP 501 that the subject device of the key exchange (AKE) process is the home IMS gateway 502.

Prior to receiving content, in step S102, the DMP 501 executes the authentication and key exchange (AKE) process according to the definition of DTCP-IP. The DMP executes the process considering the home IMS gateway 502 as a subject of execution of authentication and key exchange. Note, however, that in the authentication and key exchange (AKE) process, in step S103, the home IMS gateway 502 provides the key applied as a content encryption key to the video server 522 of the IPTV service 520 as a content providing entity. By this process, at the time of completion of the authentication and key exchange (AKE) process, the video server 522 of the IPTV service 520 as a content providing entity and the DMP as a content using entity share the key.

Then, in step S104, the DMP 501, which is a content playing device, issues a content request based on HTTP GET by applying a resource URL obtained in the content list obtaining process, thereby requesting HTTP streaming to the video server 522. The video server 522 of the IPTV service 520 encrypts content data by applying the key shared with the DMP 501 in the preceding AKE phase, and sends it to the DMP 501. The DMP 501 executes a decrypting process on the data received from the IPTV service 520 by applying the shared encryption key, and executes content playing.

As described above, with the configuration of the present invention, it becomes possible for the DMP as a content playing apparatus in the home network to receive content from a content providing server outside the home network and to play the content.

In order to enable this process, the home IMS gateway provided in the home network executes a process of executing communication with the content providing server, mapping the content providing server as a virtual home network device, i.e., generating an instance in which server information of the external server is recorded and storing the instance in a storage unit, in response to reception of a device discovery request according to the UPnP definition from the content playing apparatus in the home network, providing server information corresponding to the content providing server based on the instance to the content playing device as information of a device from which the service can be received.

Furthermore, in a case where a content obtaining request from the content playing apparatus, i.e., a request for obtaining content provided by the content providing server, is received, the home IMS gateway transfers this request to the content providing server so that the content providing server sends the content to the content playing apparatus, thereby enabling reception and playing of content at the content playing apparatus.

Furthermore, since the configuration is such that, regarding the authentication and key exchange demanded to be executed as a content sending condition defined in DLNA, the process (AKE) as defined is executed between the content playing apparatus and the home IMS gateway, and the home IMS gateway sends the generated key to the content providing server, it becomes possible for the content providing server and the content playing apparatus to share the key generated in the authentication and key exchange process. Similarly to the content sending process executed by the DMS in the home network, content on which encryption has been performed is sent from the content providing server to the content playing apparatus, so that secure content transmission and reception is achieved.

Note that this content transmission method can also be applied to Home to Home content transmission. Instead of the video server 522 of the IPTV service 520 in FIG. 11, by causing a home server of another home to provide a similar service, it is possible to transmit content of that home. In such non-commercial content transmission, there are cases where transmission is performed without performing encryption.

Hereinabove, an embodiment regarding a home IMS gateway for causing a DMP, which is a content playing device conforming to the DLNA guideline, shown in FIG. 4, to receive an IPTV service has been described. As described earlier with reference to FIG. 4, in the DMS, which is a content providing server defined in DLNA, a UPnP media server (UPnP Media Server) is implemented, and on the UPnP Media Server, a main Content Directory Service is implemented, so that it is made possible to obtain a content list and metadata by applying it. That is, by using the Content Directory Service, the DMP, which is a content playing device defined in DLNA, obtains a content list streamed by the DMS, which is a content providing server defined in DLNA. The embodiment described with reference to FIG. 9 is an embodiment in which the content list obtaining process by the UPnP Content Directory Service is executed by applying SOAP and GENA message communication defined in UPnP DA. Next, an example of a process in which a scheme of Presentation defined in UPnP DA is used will be described.

[Example of Process in which a Scheme of Presentation Defined in UPnP DA is Used]

The embodiment described below is an embodiment in which the home IMS gateway 212 shown in FIG. 3, which is an information processing apparatus of the present invention, becomes an HTTP server, and connects to UPnP Control Point implemented on an HTML browser by using a scheme of Presentation defined in UPnP DA, and the user selects a desired IPTV service from an HTML screen displayed using a browser function and receives the service.

That is, it is an example of a process in which by applying the scheme of Presentation defined in UPnP DA described earlier, a process of providing HTML data describing a service screen including, for example, a content list, content information, and so forth, from the home IMS gateway 212 to a DMP, which is a content playing device, for example, the TV (DMP) 213 shown in FIG. 3, is executed, the service screen formed of the HTML data is displayed on a display on the side of the DMP, which is a content playing device, the user selects content on the basis of the display data, and receives the IPTV service. That is, for example, by using a PC or TV having a browser function, set as a DLNA device in the home network, a list owned by the home IMS gateway 212 is presented on the display, and an IPTV service is selected to receive the service.

In this embodiment, on the content playing device, i.e., for example, the TV (DMP) 213 shown in FIG. 3, an HTML browser for implementing the Presentation function defined in UPnP DA is implemented. In this embodiment, although the UPnP Content Directory service is not used, for the streaming playing function, the content playing device is implemented on the basis of the DLNA media transfer definition and the DTCP-IP content protection definition.

The sequence of using content provided by an AS (IPTV) is divided into the following four phases.

(B1) Device discovery process
(B2a) Service screen obtainment
(B3) Authentication and key exchange process
(B4) Content streaming process Among the above phases, the processes in the individual phases (B1), (B3), and (B4) are the same as the processes described earlier with reference to FIGS. 9 and 10 in the embodiment. In the processes described with reference to FIGS. 9 and 10, (B2) content list obtaining process in steps S35 to S38 described with reference to FIG. 9 is executed. In this embodiment, in which the scheme of Presentation defined in UPnP DA is used, (B2a) service screen obtaining process is executed instead of (B2) content list obtaining process.

Figure 12:
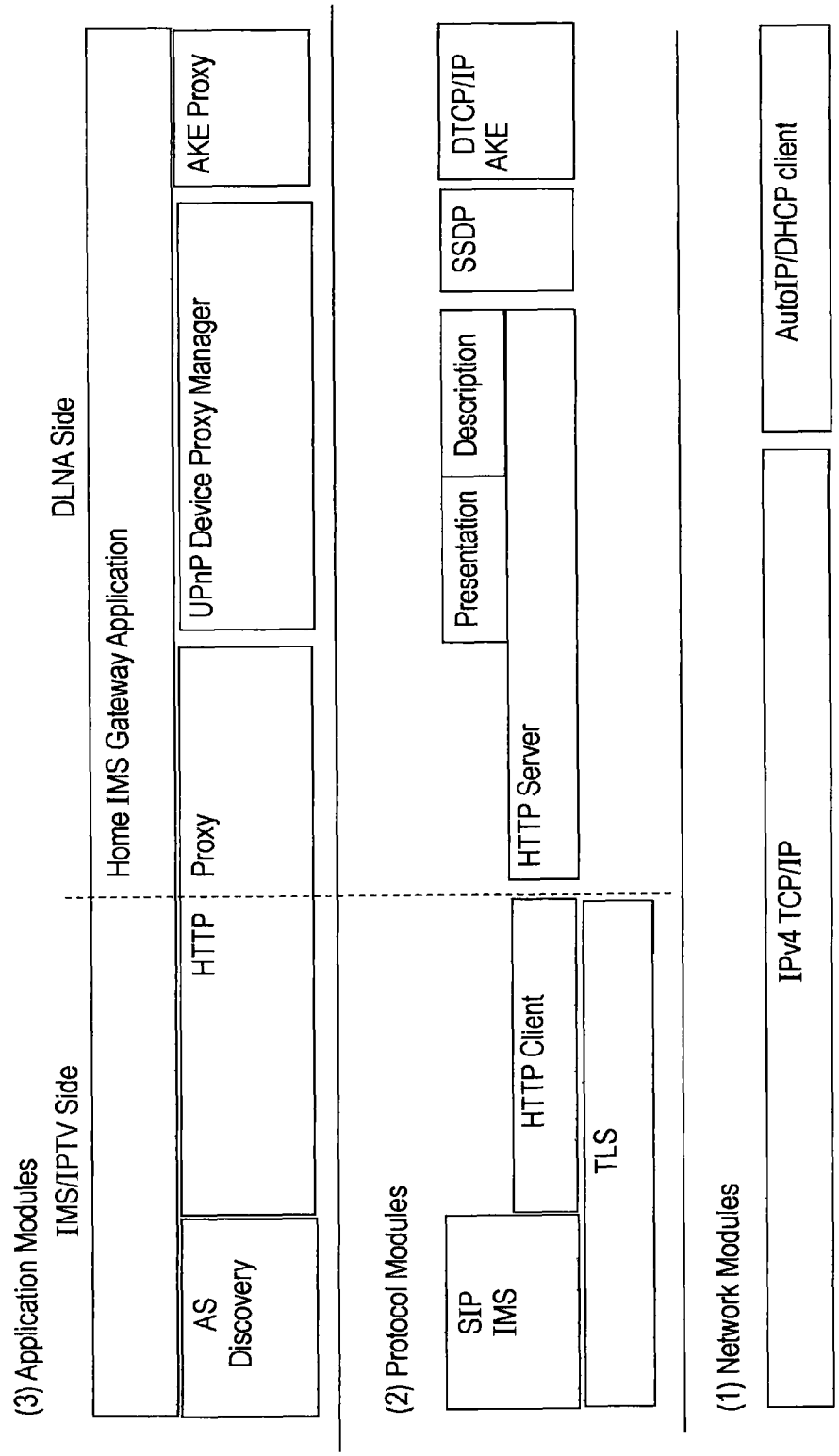
FIG. 12 is a diagram for explaining an example configuration of software modules of a home IMS gateway.

FIG. 12 shows an example configuration of software modules of the home IMS gateway 212 for executing the (B2a) service screen obtaining process. In this embodiment of service screen operating method, in order to obtain a service screen by using the function of an HTML browser, the SOAP and GENA software modules described with reference to FIG. 6 are not implemented, and furthermore, instead of the UPnP Message Proxy described with reference to FIG. 6, an HTTP Proxy that relays HTML data between an HTTP server and an HTTP client is implemented.

With reference to the sequence diagram shown in FIG. 13,
(B1) Device discovery process
(B2a) Service screen obtaining process
these sequences in this embodiment will be described.

The (B1) device discovery process is similar to the process described earlier with reference to FIG. 9. The DMP (e.g., the TV (DMP) 213 shown in FIG. 3), which is a content playing apparatus, executes the device discovery process by processing steps S31 to S34 according to the device discovery protocol defined in UPnP. By this process, the DMP as a content playing device discovers a content providing server (DMS) implemented on the home IMS gateway, and obtains a Presentation URL for obtaining HTML data provided by an HTTP server implemented on the DMS, by Device Description of the DMS according to the definition of UPnP DA.

In the (B2a) service screen obtaining process executed next, first, in step S201, the DMP as a content playing device sends an HTTP:GET request to the HTTP server of the DMS by using a Presentation URL obtained in the (B1) device discovery process.

In step S202, the HTTP Proxy implemented on the home IMS gateway transmits the HTTP:GET request received by the HTTP server from the DMP as a content playing device to the application server (AS) of the IPTV service.

The application server (AS) of the IPTV service generates, as HTML (HyperText Markup Language) data, a service screen including a content list by using content information obtained from the EPG server, and in step S203, it returns the HTML data representing the service screen to the home IMS gateway as an HTTP:OK response.

In step S204, the home IMS gateway transfers the response including the HTML data, received from the application server (AS) of the IPTV service, to the DMP as a content playing device by the HTTP Proxy.

The DMP as a content playing device generates and presents to the user a service screen formed of a content list and so forth by executing a drawing process in which an HTML browser is applied to the HTML data transferred via the home IMS gateway and sent by the application server (AS) of the IPTV service. The service screen includes a content list of the IPTV service, and the user selects content to be played from the content list.

The content selecting process is executed as, for example, a process of selecting a content list displayed on the screen by a remote controller, switch, keyboard, or a pointer such as a mouse. By the content selecting process, a resource URL of content included in the HTML data is identified. By using the URL corresponding to the selected content, the subsequent processes, i.e., the following processes described earlier with reference to FIG. 10 are executed:
(B3) Authentication and Key Exchange Process
(B4) Content streaming process By these processes, the DMP as a content playing device performs content playing. That is, the client apparatus inputs content selection information of the user regarding the content list included in the service screen, and on the basis of the content selection information, the client device identifies a URL corresponding to the selected content, i.e., a resource URL of content included in HTML data, and executes an authentication and key exchange process based on the URL and a content streaming process.

Figure 13:
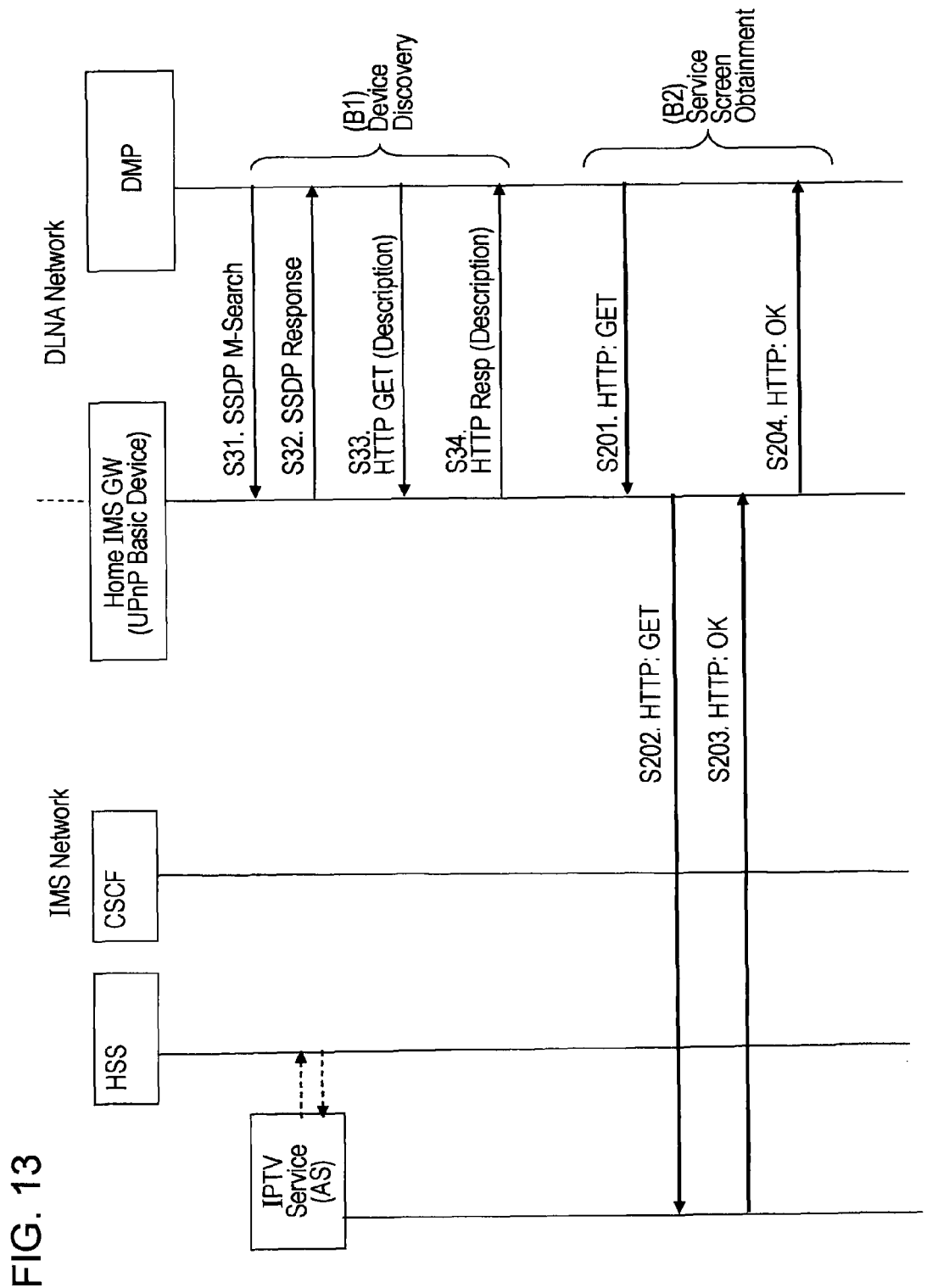
FIG. 13 is a diagram for explaining an example of a sequence of using content provided by an AS (IPTV).

Note that although the service screen obtaining process executed in steps S201 to S204 is a one-time process in the sequence diagram shown in FIG. 13, the service screen can take on a structural menu configuration represented by a plurality of items of HTML data, and it becomes possible to execute reobtaining of the service screen on the basis of user's operation of an HTML browser. That is, the configuration can be such that a process equivalent to the process of steps S201 to S204 is repeatedly executed. It is possible to provide various service screens from an AS of an IPTV service of a DMP, and the user on the DMP side can select arbitrary content from content lists presented on various service screens.

Furthermore, in a case where a content providing process provided by an IPTV service is a video on demand service, or in a case where confirmation of charging on user's purchase of a content viewing right is executed, HTML data representing a confirmation screen is transmitted from an AS of an IPTV service to a DMP via a home IMS gateway.

The user can operate the service screen displayed on a display of the DMP and receive services provided by various IPTV services while executing interactive processes.

FIG. 14 shows an example of a service screen and a streaming playing screen provided from an AS of an IPTV service to a DMP and displayed on a display of the DMP.

FIG. 14 (1) is an example of a service screen displayed on the display of the DMP in (B2) the service screen obtaining process in steps S201 to S204 described in the sequence diagram of FIG. 13.

FIG. 14 (2) is an example of a screen displayed on the display of the DMP at the time of the subsequent content streaming process. That is, it is an example of a screen displayed on a content playing apparatus in a case where (B4) the content streaming process described with reference to FIG. 10 is being executed.

Note that the two screens shown in FIG. 14, i.e.;
(1) Service screen
(2) Content streaming screen
can be switched by user's operations at appropriate timing, and the service screen presenting and content streaming processes can be executed repeatedly.

Note that although the embodiment described here has been described as an example of a process in which the scheme of Presentation defined in UPnP DA is used, for example, a similar process can be also executed in a configuration in which the scheme of an HTML Browser defined in the CEA-2014 standard is used.

The CEA-2014 standard will be described briefly. The CEA-2014 standard is a standard of Web-based protocols and frameworks, and it is a standard for remote user interfaces that use UPnP networks and the Internet. The CEA-2014 standard is a standard that defines a mechanism needed for providing a user interface under the control of a remote device connected via, for example, a network or the like. The basic process of the device that provides the user interface is a process conforming to the UPnP Device Architecture (v1.0), which is a definition regarding UPnP networks and Home UPnP. The CEA-2014 standard allows a remote display process of a user interface provided to a home UPnP device by an Internet service of a third party, and defines various UI functions used in TV, mobile phones, and portable devices. Note that the CEA-2014 standard is configured as a standard including definitions corresponding to specific specifications of CEA-2027-A, which is a UI standard of home networks.

In a device on which an HTML Browser defined in the CEA-2014 standard is implemented, by obtaining a service screen using the HTML Browser, a process similar to the process described with reference to FIG. 13 is achieved. Note that in this case, the UPnP Device class of the home IMS gateway becomes a Remote UI Server, and HTML data according to an HTML browser profile defined in CEA-2014 is used.

The present invention has been described above in detail with reference to specific embodiments. However, obviously, it is possible for those skilled in the art to make modifications or alternatives of the embodiments without departing from the spirit of the present invention. That is, the present invention has been disclosed by way of examples, and the present invention should not be construed restrictively. The spirit of the present invention should be determined on the basis of the claims.

Note that the series of processes described in this specification can be executed by hardware, by software, or by combination of hardware and software. When the series of processes is executed by software, the process can be executed by installing a program in which the processing sequences are recorded on a memory of a computer embedded in special hardware or on a general-purpose computer that is capable of executing various processes.

For example, the program may be recorded in advance on a hard disk or a ROM (Read Only Memory) as a recording medium. Alternatively, the program may be stored (recorded) temporarily or permanently on a removable recording medium such as a flexible disc, a CD-ROM (Compact Disc Read Only Memory), an MO (Magneto optical) disc, a DVD (Digital Versatile Disc), a magnetic disc, or a semiconductor memory. Such a removable recording medium can be provided in the form of what is called package software.

Note that instead of installing the program from a removable recording medium to a computer as described above, the program may be transferred by wireless from a download site to a computer, or transferred by wire to a computer via a network such as a LAN (Local Area Network) or the Internet, so that the computer can receive the program transferred and install the program on an internal recording medium such as a hard disk.

The various processes described in this specification need not necessarily be executed sequentially in the orders described, and may be executed in parallel or individually as needed or in accordance with the processing ability of an apparatus that executes the processes. A system in this specification refers to a logical combination of a plurality of apparatuses, and is not limited to one in which the constituent apparatuses are disposed within the same case.

INDUSTRIAL APPLICABILITY

As described hereinabove, according to the configuration of the present invention, it becomes possible for a DMP as a content playing apparatus, which is a client device in a home network, to receive content from a content providing server outside the home network and to play the content. That is, a home IMS gateway, which is an information processing apparatus according to the present invention, executes communication with a content providing server to map the content providing server as a virtual home network device, and in response to reception of a device discovery request from a content playing apparatus in a home network, the home IMS gateway provides the content playing device with server information of the content providing server as information of a device from which a service can be received. Furthermore, the home IMS gateway causes a content obtaining request to be transferred from the content playing apparatus to the content providing server so that the content providing server sends content to the content playing apparatus. Furthermore, authentication and key exchange defined in DLNA are also executed between the content playing apparatus and the home IMS gateway as defined. By sending a key generated from the home IMS gateway to the content providing server, the content providing server and the content playing apparatus can share the key, so that secure transmission and reception of encrypted content is achieved between both parties.

The invention claimed is:

1. An information processing apparatus, comprising:
a communication interface used for data communication;
a data processing unit that executes a process of executing communication with an external server existing outside a home network to map the external server as a virtual home network device; and
a storage unit that stores the mapping information,
wherein the data processing unit:
executes a process of, in response to reception of a device discovery request from a client device in the home network, obtaining the mapping information stored in the storage unit, and on the basis of the mapping information, providing the client device with server information corresponding to the external server as information of a device from which a service can be received,
executes a process of receiving from the client device a content list request to the mapped external server, transferring the request to the external server, obtaining the content list from the external server, and providing the client device with the content list, and
execute a process of providing the client device with setting information that sets the information processing apparatus as a counterparty of an authentication and key exchange process that the client device is requested to execute as a condition for obtaining content from the external server at the client device.

2. The information processing apparatus according to claim 1, characterized in that the data processing unit is configured to:
on the basis of communication with the external server existing outside the home network, execute a process of generating an instance in which the external server information is recorded and storing the instance in the storage unit, and
in response to reception of the device discovery request from the client device in the home network, provide the client device with the external server information obtained from the instance stored in the storage unit.

3. The information processing apparatus according to claim 1, characterized in that the data processing unit is configured to:
in response to reception of the device discovery request from the client device, execute a process of providing the client device with the external server information as information of a device from which a service can be received and transferring subsequent requests and responses from the client device to the external server, or execute a process of providing the client device with information of the external server so that direct communication is performed between the client device and the external server.

4. The information processing apparatus according to claim 1, characterized in that:
the external server is a service providing server outside the home network in which an IP multimedia subsystem (IMS) is used, and
the data processing unit is configured to:
execute a process of mapping the service providing server as a home network device.

5. The information processing apparatus according to claim 1, characterized in that the data processing unit is configured to:
execute a process of mapping the external server as a digital media server (DMS) defined as a content providing server in DLNA (Digital Living Network Alliance).

6. The information processing apparatus according to claim 1, characterized in that the data processing unit is configured to:
execute a process of executing communication with external servers existing outside the home network, obtaining a service list provided by the external servers, obtaining service selection information of a user based on the service list, and mapping only an external server that provides a selected service as a virtual home network device.

7. The information processing apparatus according to claim 6, characterized in that the data processing unit is configured to:
execute a process of outputting the service list to a display unit of the information processing apparatus or to a home network connecting device, sending user selection information regarding the service list to a management server outside the home network, and mapping, as a virtual home network device, an external server that provides a service for which selection information has been registered at the management server.

8. The information processing apparatus according to claim 1, characterized in that the content list is a list in which a content URL corresponding to content, provided to the external server, is set, and having a setting such that the client device is allowed to obtain the content based on the content URL without involving the information processing apparatus.

9. The information processing apparatus according to claim 1, characterized in that the data processing unit is configured to:
execute a process of providing the client device with a content list in which the setting information that sets the information processing apparatus as the counterparty of the authentication and key exchange process is included in meta information.

10. The information processing apparatus according to claim 1, characterized in that the data processing unit is configured to:
execute a process of sending a key generated in an authentication and key exchange process executed with the client device to the external server as a content obtaining source.

11. The information processing apparatus according to claim 1, characterized in that the data processing unit is configured to:
execute a process of receiving from the client device a service screen obtaining request to the mapped external server, transferring the request to the external server, and obtaining a service screen from the external server and providing the client device with the service screen.

12. The information processing apparatus according to claim 1, characterized in that the data processing unit is configured to:
execute a process of receiving from the client device a service screen obtaining request according to HTTP (Hyper Text Transfer Protocol), transferring the request to the external server, and receiving from the external server an HTTP response including a service screen formed of HTML (Hyper Text Markup Language) data and transferring the HTTP response to the client device.

13. An information communication system, comprising:
a client apparatus in a home network;
a content providing server outside the home network; and
a gateway apparatus in the home network,
wherein the gateway apparatus:
communicates with the content providing server to map the content providing server as a virtual home network device;
in response to reception of a device discovery request from the client apparatus, obtains the mapping information, and on the basis of the mapping information, provides the client device with server information corresponding to the content providing server as information of a device from which a service can be received;
receives from the client apparatus a request for obtaining content provided by the content providing server and transfers the request to the content providing server;
receives from the client apparatus a content list request to the mapped content providing server, transfers the request to the content providing server, and obtains a content list from the content providing server; and
provides the client apparatus with setting information that sets the gateway apparatus as a counterparty of an authentication and key exchange process executed at the client apparatus as a condition for obtaining content from the content providing server, and
wherein the client apparatus:
receives the content list provided by the content providing server and plays the content list.

14. The information communication system according to claim 13, characterized in that the gateway apparatus:
sends an encryption key generated in the authentication and key exchange process executed with the client apparatus to the content providing server.

15. The information communication system according to claim 14, characterized in that:
the content providing server encrypts content to send by using the encryption key received from the gateway apparatus and sends encrypted content generated to the client apparatus, and the client apparatus decrypts the received encrypted content by using the encryption key.

16. The information communication system according to claim 13, characterized in that the gateway apparatus:
receives from the client apparatus a service screen obtaining request based on HTTP (Hyper Text Transfer Protocol), transfers the request to the content providing server, and receives from the content providing server an HTTP response including a service screen formed of HTML (Hyper Text Markup Language) data and transfers the HTTP response to the client apparatus.

17. The information communication system according to claim 13, characterized in that the client apparatus:
displays a service screen on a display, the service screen being generated by executing a drawing process by using an HTML browser on HTML data received from the content providing server via the gateway apparatus.

18. The information communication system according to claim 17, characterized in that the client apparatus is configured to:
input content selection information from a user regarding a content list included in the service screen, identify a resource URL corresponding to selected content on the basis of the content selection information, and execute a content streaming process based on the resource URL.

19. An information processing method for an information processing apparatus, in which a process of making setting on a client device connected to a home network so that it is allowed to use content provided by an external server outside the home network is executed, characterized by comprising:
a mapping process step, executed at a data processing unit of the information processing apparatus, of executing communication with the external server via a communication unit to execute a mapping process of setting the external server as a virtual home network device, and storing mapping information based on the mapping process in a storage unit;
an external server information providing step, executed at the data processing unit in response to reception of a device discovery request from the client device, of executing a process of obtaining the mapping information stored in the storage unit, and on the basis of the mapping information, providing the client device with server information corresponding to the external server as information of a device from which a service can be received;
a processing step, executed at the data processing unit, of receiving from the client device a content list request to the mapped external server, transferring the request to the external server, obtaining the content list from the external server, and providing the client device with the content list; and
a step of executing, at the data processing unit, a process of providing the client device with setting information that sets the information processing apparatus as a counterparty of an authentication and key exchange process that the client device is requested to execute as a condition for obtaining content from the external server at the client device.

20. The information processing method according to claim 19, characterized in that:
the mapping process step is:
a step of executing a process of, on the basis of communication with the external server existing outside the home network, generating an instance in which the external server information is recorded and storing the instance in the storage unit, and
the external server information providing step is:
a step of, in response to reception of the device discovery request from the client device in the home network, providing the client device with the external server information obtained from the instance stored in the storage unit.

21. The information processing method according to claim 19, further characterized in that:
in response to reception of the device discovery request from the client device, the data processing unit executes a process of providing the client device with the external server information as information of a device from which a service can be received and transferring subsequent requests and responses from the client device to the external server, or executes a process of providing the client device with information of the external server so that direct communication is performed between the client device and the external server.

22. The information processing method according to claim 19, characterized in that:
the external server is a service providing server outside the home network in which an IP multimedia subsystem (IMS) is used, and
the mapping process step is:
a step of executing a process of mapping the service providing server as a home network device.

23. The information processing method according to claim 19, characterized in that the mapping process step is:
a step of executing a process of mapping the external server as a digital media server (DMS) defined as a content providing server in DLNA (Digital Living Network Alliance).

24. The information processing method according to claim 19, characterized in that the mapping process step is:
a step of executing a process of executing communication with external servers existing outside the home network, obtaining a service list provided by the external servers, obtaining service selection information of a user based on the service list, and mapping only an external server that provides a selected service as a virtual home network device.

25. The information processing method according to claim 24, characterized in that the mapping process step is:
a step of executing a process of outputting the service list to a display unit of the information processing apparatus or to a home network connecting device, sending user selection information regarding the service list to a management server outside the home network, and mapping, as a virtual home network device, an external server that provides a service for which selection information has been registered at the management server.

26. The information processing method according to claim 19, characterized in that the content list is a list in which a content URL corresponding to content, provided to the external server, is set, and having a setting such that client device is allowed to obtain the content based on the content URL without involving the information processing apparatus.

27. The information processing method according to claim 19, further characterized in that:
at the data processing unit, a process of providing the client device with a content list in which the setting information that sets the information processing apparatus as the counterparty of the authentication and key exchange process is included in meta information is executed.

28. The information processing method according to claim 19, characterized by further comprising:
a step of executing, at the data processing unit, a process of sending a key generated in an authentication and key exchange process executed with the client device to the external server as a content obtaining source.

29. The information processing method according to claim 19, characterized by further comprising:
a step of executing, at the data processing unit, a process of receiving from the client device a service screen obtaining request to the mapped external server, transferring the request to the external server, and obtaining a service screen from the external server and providing the client device with the service screen.

30. The information processing method according to claim 19, characterized by further comprising:

a step of executing, at the data processing unit, a process of receiving from the client device a service screen obtaining request according to HTTP (Hyper Text Transfer Protocol), transferring the request to the external server, and receiving from the external server an HTTP response including a service screen formed of HTML (Hyper Text Markup Language) data and transferring the HTTP response to the client device.

31. A non-transitory computer readable storage medium having stored therein a computer program for causing an information processing apparatus to execute a process of making setting on a client device connected to a home network so that it is allowed to use content provided by an external server outside the home network, characterized by causing execution of:

a mapping process step of causing a data processing unit of the information processing apparatus to execute communication with the external server via a communication unit, to execute a mapping process of setting the external server as a virtual home network device, and to store mapping information based on the mapping process in a storage unit;

an external server information providing step of causing the data processing unit to execute a process of, in response to reception of a device discovery request from the client device, obtaining the mapping information stored in the storage unit, and on the basis of the mapping information, providing the client device with server information corresponding to the external server as information of a device from which a service can be received;

a processing step, executed at the data processing unit, of receiving from the client device a content list request to the mapped external server, transferring the request to the external server, obtaining the content list from the external server, and providing the client device with the content list; and a processing step of providing the client device with setting information that sets the information processing apparatus as a counterparty of an authentication and key exchange process that the client device is requested to execute as a condition for obtaining content from the external server at the client device.

* * * * *